United States Patent
Yamada et al.

(10) Patent No.: US 11,052,949 B2
(45) Date of Patent: Jul. 6, 2021

(54) REAR VEHICLE BODY STRUCTURE

(71) Applicant: Mazda Motor Corporation, Hiroshima (JP)

(72) Inventors: Ken Yamada, Hatsukaichi (JP); Akiyoshi Masuda, Aki-gun (JP); Hidenori Matsuoka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 158 days.

(21) Appl. No.: 16/563,459

(22) Filed: Sep. 6, 2019

(65) Prior Publication Data

US 2020/0086922 A1 Mar. 19, 2020

(30) Foreign Application Priority Data

Sep. 14, 2018 (JP) ............... JP2018-172835

(51) Int. Cl.
| | | |
|---|---|---|
| *B62D 21/15* | (2006.01) | |
| *B62D 25/08* | (2006.01) | |
| *B62D 25/16* | (2006.01) | |
| *B62D 29/00* | (2006.01) | |

(52) U.S. Cl.
CPC ......... *B62D 21/155* (2013.01); *B62D 25/088* (2013.01); *B62D 25/16* (2013.01); *B62D 29/008* (2013.01)

(58) Field of Classification Search
CPC .... B62D 21/155; B62D 25/088; B62D 25/16; B62D 29/008
See application file for complete search history.

(56) References Cited

U.S. PATENT DOCUMENTS

| | | | | |
|---|---|---|---|---|
| 2011/0156447 A1* | 6/2011 | Matsuoka | ............ | B62D 25/088 296/203.04 |
| 2013/0241233 A1* | 9/2013 | Ohnaka | ................ | B62D 21/152 296/187.1 |
| 2014/0300137 A1* | 10/2014 | Komiya | ............... | B62D 25/087 296/187.11 |
| 2016/0023685 A1* | 1/2016 | Fujii | .................... | B62D 25/088 280/124.154 |
| 2018/0370572 A1* | 12/2018 | Sekiya | ................. | B62D 25/085 |

FOREIGN PATENT DOCUMENTS

JP S641063 U 1/1989

* cited by examiner

*Primary Examiner* — Lori L Lyjak
(74) *Attorney, Agent, or Firm* — Alleman Hall Creasman & Tuttle LLP

(57) ABSTRACT

Provided is a rear vehicle body structure that includes: a right and left pair of frame members each extending in a front-rear direction and having a damper supporting part; rear wheel wells; a rear floor panel; a rear cross member upper part connecting the right and left pair of frame members to each other on a front side of the damper supporting parts; front side reinforcements provided along a vehicle cabin inner side of each of the rear wheel wells and extending in an up-down direction on the front side of the damper supporting parts; and a reinforcing member mounted on each of the frame members and having a reinforcing member main body that reinforces the damper supporting part and a reinforcing member coupling part that couples together the rear cross member upper part and the front side reinforcement.

8 Claims, 16 Drawing Sheets

REAR VEHICLE BODY STRUCTURE

BACKGROUND OF THE INVENTION

Field of the Invention

The present invention relates to a rear vehicle body structure of a vehicle.

Description of the Related Art

Japanese Utility Model Laid-Open No. 64-1063 discloses a rear vehicle body structure provided with a damper supporting part that is located adjacent to and on the inner side in the vehicle width direction of a rear wheel well and supports a damper provided in a rear suspension. The structure of this literature is further provided with a reinforcement that extends upward from an upper part of the rear wheel well and forms a closed cross section together with a rear pillar.

It has been becoming increasingly important in recent years to enhance a sense of unity (also called a direct sense) that an occupant feels with the motion of the vehicle body. To achieve this, it is desirable in the rear part of the vehicle body that the motion of the rear suspension, i.e., a load input from the damper into the damper supporting part, be efficiently transmitted to the rear part of the vehicle body.

In the structure of Japanese Utility Model Laid-Open No. 64-1063, however, only the rigidity of the vehicle body around the rear pillar is increased by the reinforcement, and the rigidity around the damper supporting part is not increased. As a result, the structure described in this document does not allow a load input from the damper to be efficiently transmitted through the damper supporting part to the rear part of the vehicle body, thus leaving room for improvement in terms of enhancing a sense of unity that an occupant feels with the motion of the vehicle body.

An object of the present invention is to provide a rear vehicle body structure that can enhance a sense of unity that an occupant feels with the motion of the vehicle body by efficiently transmitting a load input into the damper supporting part to the rear part of the vehicle body.

SUMMARY OF THE INVENTION

To achieve the above object, the present application features the following configurations:

A rear vehicle body structure according to a first aspect of the present application includes: a right and left pair of frame members extending in a front-rear direction in a rear part of a vehicle body, each having a respective damper supporting part which is located at an intermediate part in the front-rear direction of the respective frame member and to which a respective damper provided in a rear suspension is mounted from below; a pair of rear wheel wells, each provided adjacent to and on an outer side in a vehicle width direction of a respective one of the frame members; a rear floor extending inward in the vehicle width direction from inner ends in the vehicle width direction of the frame members; a cross member that is provided on an upper surface of the rear floor and connects the right and left pair of frame members to each other in the vehicle width direction on a front side of the damper supporting parts; a pair of front side reinforcements, each provided along a vehicle cabin inner side of a respective one of the rear wheel wells and extending in an up-down direction on the front side of the damper supporting parts; and a pair of reinforcing members, each mounted on a respective one of the frame members and having a respective reinforcing member main body that reinforces the respective damper supporting part and a respective reinforcing member coupling part that couples together the cross member and a respective one of the front side reinforcements.

In the rear vehicle body structure of a second aspect of the present application according to the first aspect, each reinforcing member coupling part may have a cross section perpendicular to an extension direction thereof formed in a squared U-shape that opens toward a vehicle outer side.

In the rear vehicle body structure of a third aspect of the present application according to the second aspect, the cross member may have a cross section perpendicular to an extension direction thereof formed in a top hat shape opening downward, each front side reinforcement may have a cross section perpendicular to an extension direction thereof formed in a top hat shape opening outward in the vehicle width direction, and the cross member, the front side reinforcements, and the reinforcing member coupling parts may form a closed cross section on the vehicle cabin inner side of the rear floor, the frame members, and the rear wheel wells.

In the rear vehicle body structure of a fourth aspect of the present application according to the third aspect, the cross member may have a front and rear pair of cross member ridges for forming the top hat-shaped cross section that is formed in an upper part of the cross member and extends in the vehicle width direction, the front side reinforcements may each have a front and rear pair of front reinforcing part ridges for forming the top hat-shaped cross section that is formed at an inner end in the vehicle width direction of the front side reinforcement and extends in the up-down direction, the reinforcing member coupling parts may each have a front and rear pair of coupling part ridges for forming the squared U-shaped cross section that is formed at an end of the reinforcing member coupling part on the vehicle cabin inner side, and the front and rear pair of cross member ridges, the front and rear pair of front reinforcing part ridges, and the front and rear pair of coupling part ridges may be continuous with one another.

In the rear vehicle body structure of a fifth aspect of the present application according to any one of the first to fourth aspects, the reinforcing member coupling parts may each have a coupling part inclined portion that, as seen in a front view of the vehicle body, extends in a straight line in a direction oriented outward in the vehicle width direction and inclined upward so as to couple together the cross member and the respective front side reinforcement as a bracing strut.

In the rear vehicle body structure of a sixth aspect of the present application according to any one of the first to fifth aspects, the reinforcing members each may have a front-rear-direction rib that couples together the respective reinforcing member main body and the respective reinforcing member coupling part in the front-rear direction.

In the rear vehicle body structure of a seventh aspect of the present application according to the sixth aspect, each reinforcing member main body may have: a reinforcing member upper wall that supports the respective damper supporting part from above; a reinforcing member inner wall that extends downward from an inner end in the vehicle width direction of the reinforcing member upper wall and supports the inner end in the vehicle width direction of the respective frame member on the inner side in the vehicle width direction; and an outer flange that extends upward from an outer end in the vehicle width direction of the reinforcing member upper wall and abuts against the respective rear wheel well on the inner side in the vehicle width direction, and each reinforcing member may have a plurality of front-rear-direction ribs, and the respective reinforcing member upper wall, the respective reinforcing member inner wall, and the respective outer flange are coupled to the respective reinforcing member coupling part by the respective front-rear-direction ribs.

With the above-described configurations, the respective aspects of the present application can produce the following effects.

First, according to the first aspect, the reinforcing member that reinforces the damper supporting part can be used to couple together the cross member and the front side reinforcement as well as to reinforce the coupling portion between the frame member and the cross member. Thus, the rigidity of a framework part of the rear vehicle body including the cross member, the front side reinforcements, and the frame members can be enhanced by the reinforcing members. Moreover, a load input from the damper into the damper supporting part is transmitted through the reinforcing member to this framework part of the rear vehicle body, which enhances a sense of unity that an occupant feels with the motion of the vehicle body.

According to the second aspect, the reinforcing member coupling part is likely to have high rigidity, and the cross member and the front side reinforcement can be thereby firmly coupled together. Thus, the rigidity of the rear vehicle body can be effectively enhanced, and therefore a sense of unity that an occupant feels with the motion of the vehicle body can be further enhanced.

According to the third aspect, the cross section of the framework part of the rear vehicle body from the cross member through the reinforcing member coupling parts to the front side reinforcements can be formed as a closed cross section. Thus, the rigidity of the rear vehicle body can be effectively enhanced, and therefore a sense of unity that an occupant feels with the motion of the vehicle body can be further enhanced.

According to the fourth aspect, the ridges for forming the top hat-shaped cross section or the squared U-shaped cross section extend continuously in the framework part of the rear vehicle body from the cross member through the reinforcing member coupling parts to the front side reinforcements. Thus, the rigidity of the rear vehicle body can be more effectively enhanced, and therefore a sense of unity that an occupant feels with the motion of the vehicle body can be even further enhanced.

According to the fifth aspect, the framework part of the rear vehicle body from the cross member through the reinforcing member coupling parts to the front side reinforcements is likely to be restrained from undergoing so-called matchbox deformation in the vehicle width direction. Thus, the rigidity of the rear vehicle body in the vehicle width direction can be more effectively enhanced, and therefore a sense of unity that an occupant feels with the motion of the vehicle body can be even further enhanced.

According to the sixth aspect, a load input from the damper into the reinforcing member main body is effectively transmitted through the front-rear-direction rib to the reinforcing member coupling part. Since the front-rear-direction rib extends so as to couple together the reinforcing member main body and the reinforcing member coupling part in the front-rear direction, especially a load in the front-rear direction among loads input from the damper is effectively transmitted to the reinforcing member coupling part.

According to the seventh aspect, the reinforcing member main body has a step shape, which increases its rigidity.

Moreover, the reinforcing member coupling part is coupled to the surfaces of the step-shaped reinforcing member main body through the respective front-rear-direction ribs. Thus, the coupling rigidity between the reinforcing member main body and the reinforcing member coupling part can be enhanced evenly along the extension direction of the reinforcing member coupling part. As a result, the rigidity of the reinforcing member as a whole is enhanced, so that the rigidity of the rear vehicle body can be even more effectively enhanced, and therefore a sense of unity that an occupant feels with the motion of the vehicle body can be even further enhanced.

The present invention can enhance a sense of unity that an occupant feels with the motion of the vehicle body by efficiently transmitting a load input into the damper supporting part to the rear part of the vehicle body.

DETAILED DESCRIPTION OF THE PREFERRED EMBODIMENTS

An embodiment according to the present invention will be described below in accordance with the accompanying drawings. The following description is essentially merely illustrative and not intended to limit the present invention or its applications or purposes. The drawings are schematic and the ratios of distances etc. are not consistent with the actual ones.

Overall Configuration of Rear Vehicle Body Structure

In the following, the overall configuration of a rear vehicle body structure V according to an embodiment of the present invention will be described with reference to the accompanying drawings.

Figure 1:
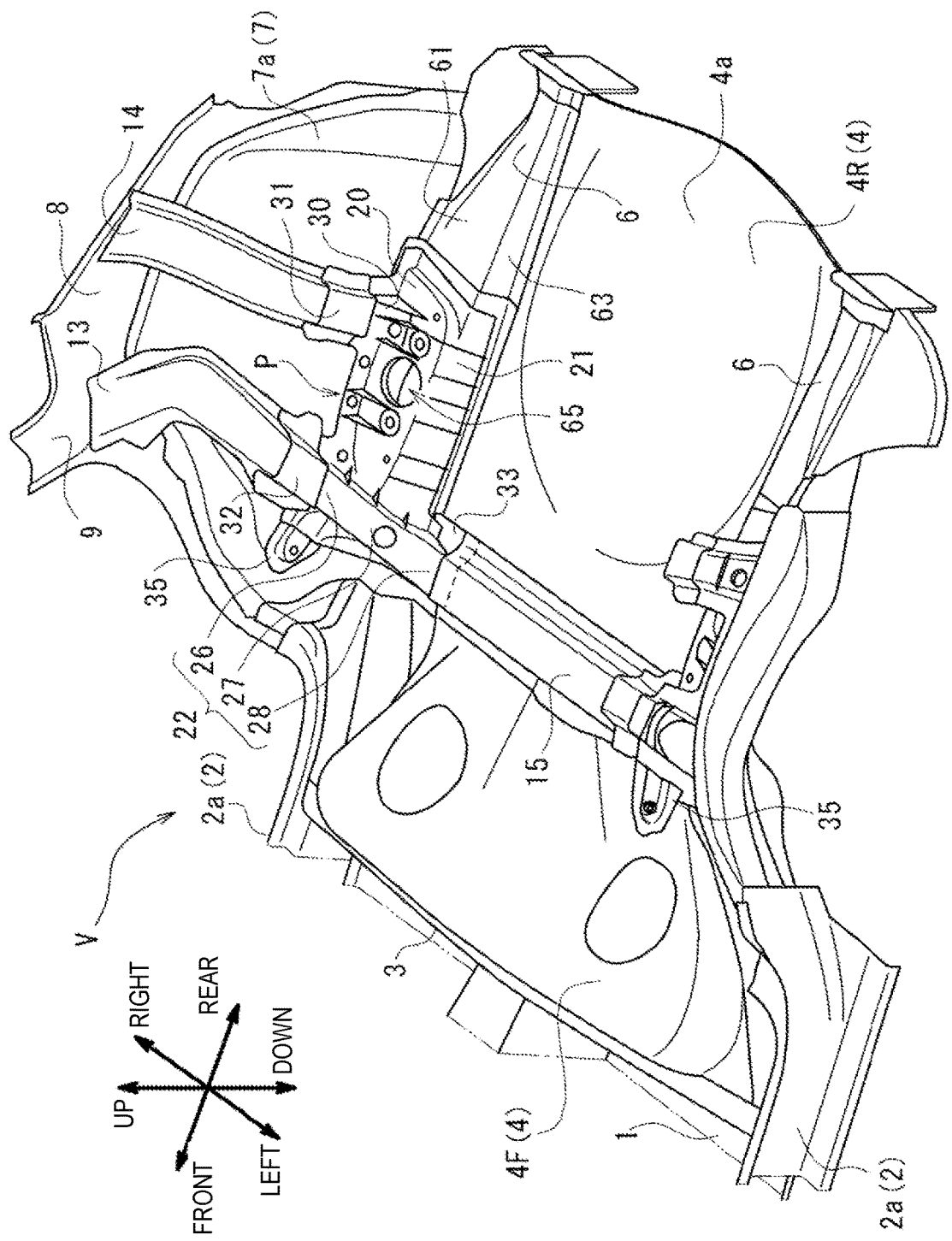
FIG. 1 is a perspective view showing a rear vehicle body structure according to an embodiment of the present invention.

As shown in FIG. 1, a floor panel 1 that forms a floor surface of a vehicle cabin, and a right and left pair of side sills 2 that are joined to both sides in a vehicle width direction of the floor panel 1 and extend in a front-rear direction, are provided on a front side of the rear vehicle body structure V. Each of the side sills 2 has a side sill inner portion 2a located on an inner side in the vehicle width direction, and a side sill outer portion 2b (see FIG. 7) located on an outer side in the vehicle width direction, and these side sill portions are joined together in the vehicle width direction and extend in the front-rear direction, with cross sections thereof orthogonal to the front-rear direction forming a rectangular closed cross section.

Figure 3:
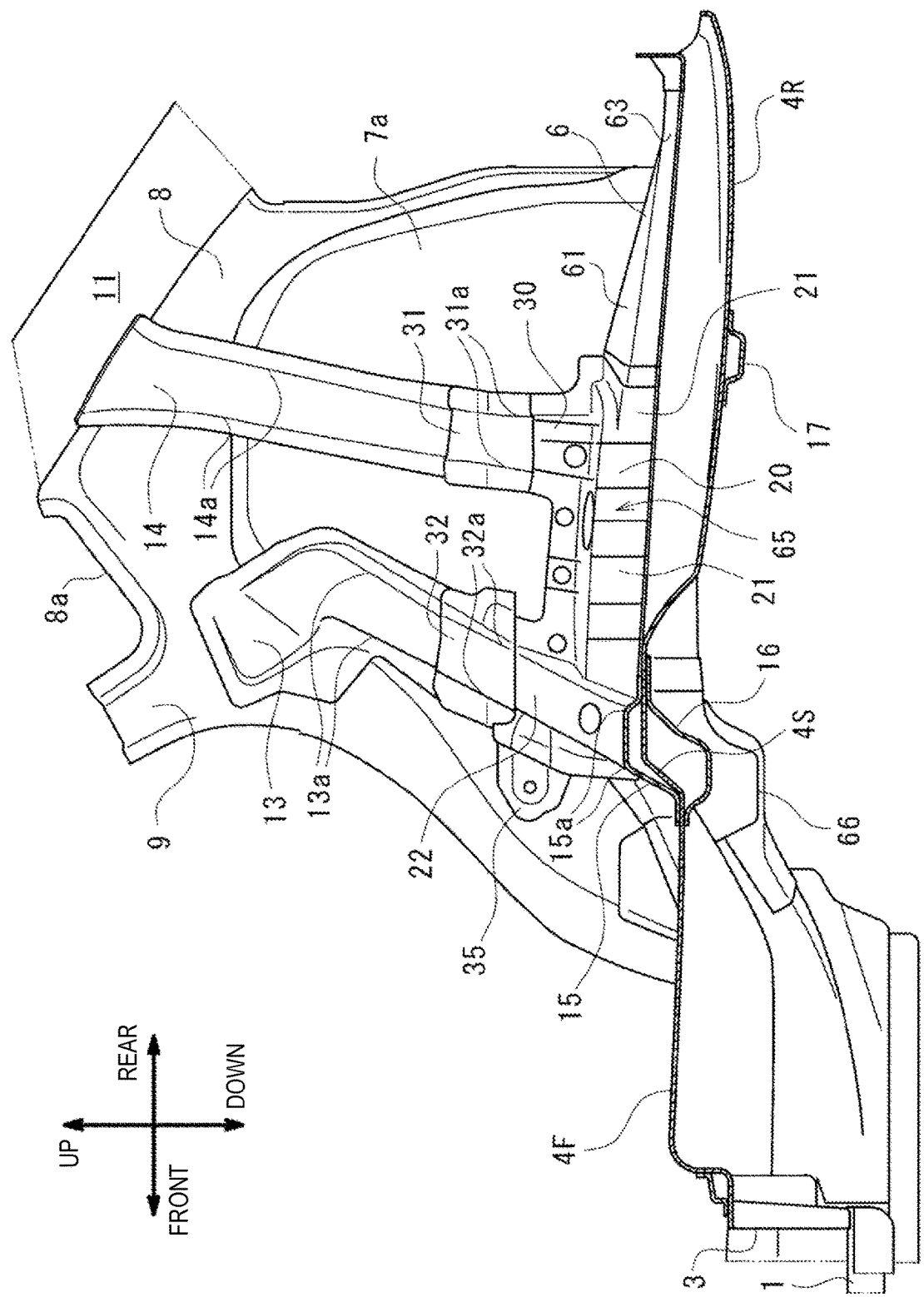
FIG. 3 is a sectional view taken along line III-III of FIG. 2.

Referring also to FIG. 3, a rear floor panel 4 extending rearward is integrally and continuously provided on a rear side of the floor panel 1, with a kick-up portion 3 rising upward interposed therebetween. On both sides in the vehicle width direction of the rear floor panel 4, a right and left pair of rear side frames 6 (hereinafter referred to as "frame members") extending in the front-rear direction are provided.

As will be described later, each of the frame members 6 is provided with a damper supporting part 65 to which a damper 92 of a rear suspension 91 (see FIG. 8 to FIG. 10) is mounted from below. Each frame member 6 has a reinforcing member 20 mounted thereon that reinforces the damper supporting part 65.

The rear floor panel 4 has a rear-floor front part 4F located on the front side and a rear-floor rear part 4R located at a raised level on the rear side of the rear-floor front part 4F, with a rising portion 4S interposed therebetween. A fuel tank (not shown) is mounted on a lower side of the rear-floor front part 4F, while a rear seat 90 (see FIG. 7) is mounted on an upper side thereof. The rear-floor rear part 4R mainly forms a floor surface of a luggage compartment, and a recess 4a that is depressed downward and serves as a spare tire pan for housing a spare tire or as a housing part of other components is integrally formed at a middle portion in the vehicle width direction of the rear-floor rear part 4R.

Each frame member 6 extends in the front-rear direction from the kick-up portion 3 to a rear end of the rear floor panel 4, has a cross section orthogonal to the front-rear direction formed as a rectangular closed cross section, and is coupled at a front end to a rear portion of the side sill 2.

Figure 2:
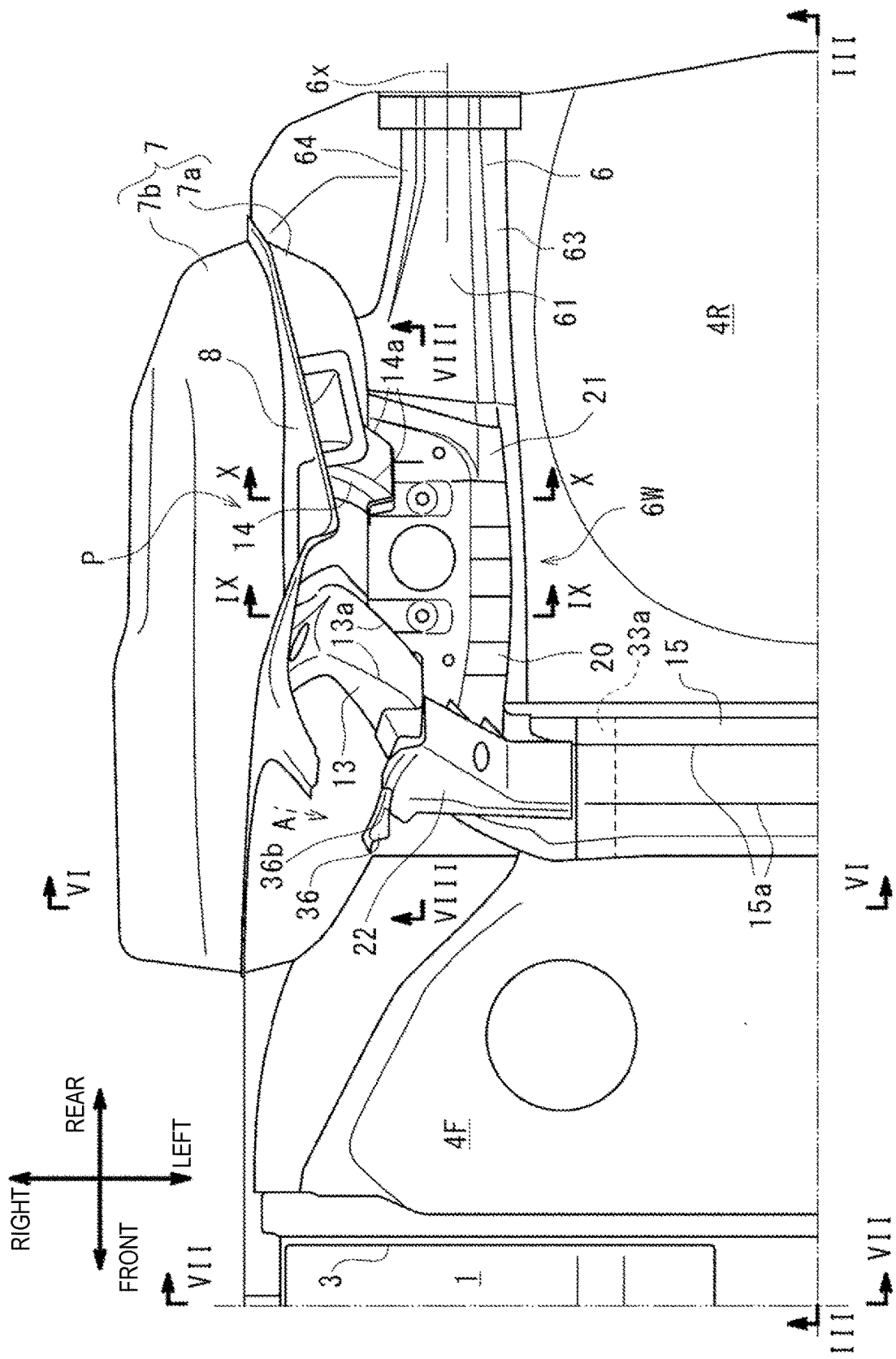
FIG. 2 is a top view of the rear vehicle body structure shown in FIG. 1.

As shown in FIG. 2, a rear wheel well 7 (hereinafter referred to as a "wheel well") is provided adjacent to and on the outer side in the vehicle width direction of each frame member 6. Referring also to FIG. 3, a rear side panel 8 (hereinafter referred to as a "side panel") extending upward and forming a side surface of a rear part of the vehicle cabin is provided on the upper side of the wheel well 7.

The wheel well 7 has a wheel well inner part 7a that bulges inward in the vehicle width direction relative to the side panel 8, and a wheel well outer part 7b (see FIG. 2) that bulges outward in the vehicle width direction relative to the side panel 8, and these wheel well parts are joined together at upper ends along with the side panel 8 in the vehicle width direction to form the wheel well 7. The wheel well inner part 7a is joined at a lower end to the frame member 6 on the outer side in the vehicle width direction.

Figure 6:
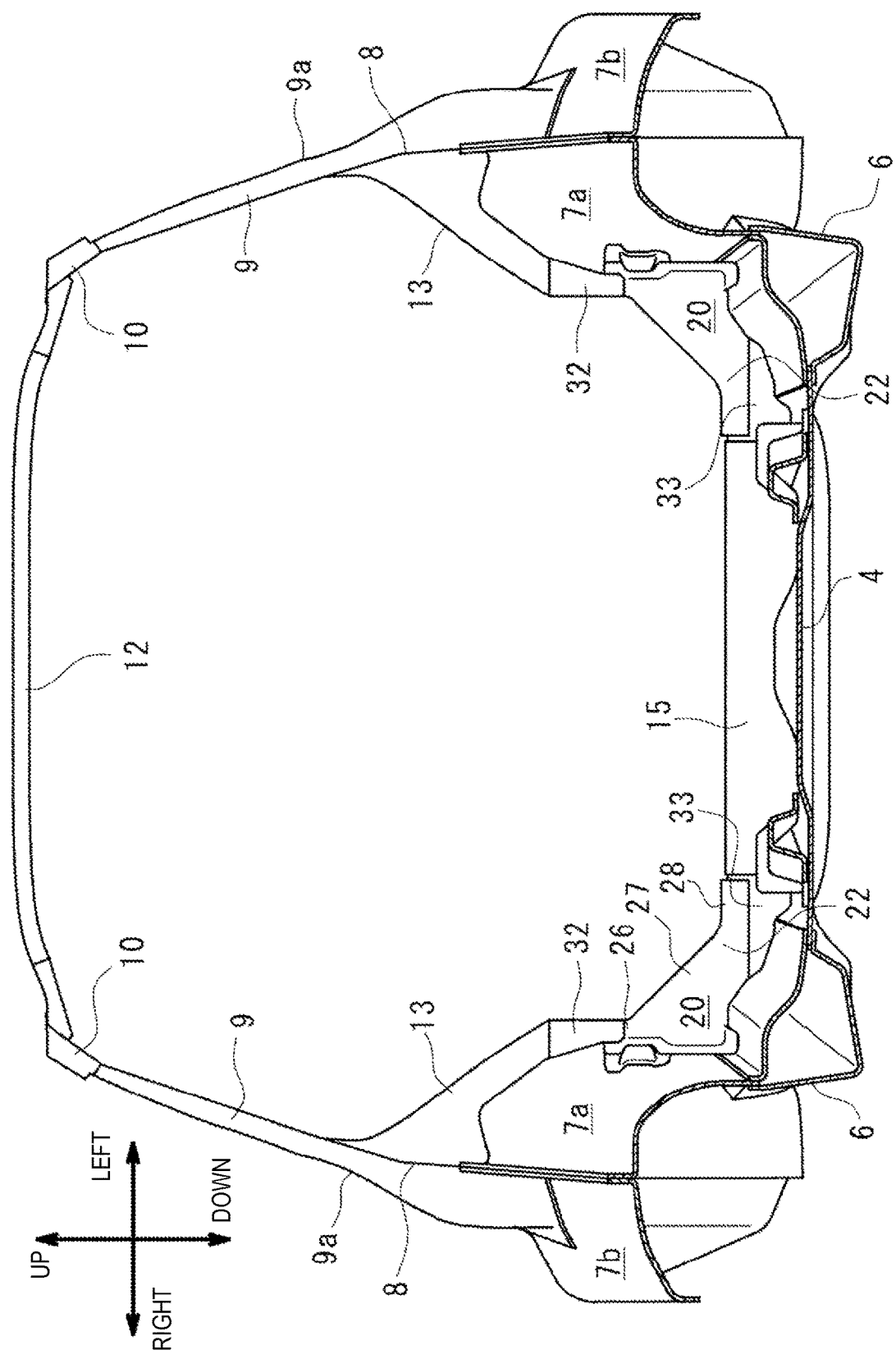
FIG. 6 is a front view of the rear vehicle body structure of FIG. 1.
Figure 7:
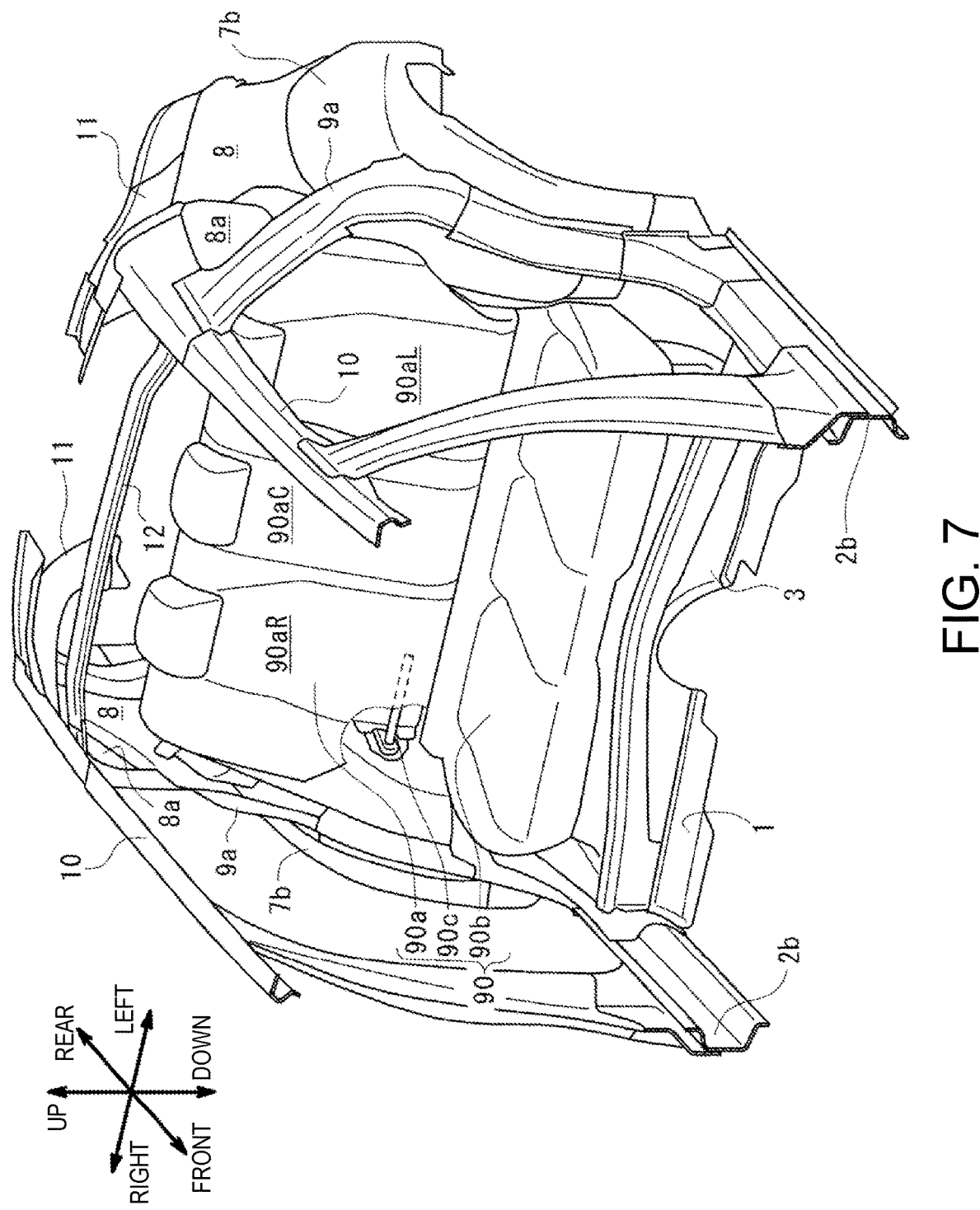
FIG. 7 is a perspective view showing a state where a rear seat is mounted in the rear vehicle body structure of FIG. 1.

As shown in FIG. 3, the side panel 8 has a panel opening 8a in which a quarter glass (not shown) is mounted. As shown in FIG. 6 and FIG. 7, a rear pillar outer part 9a is joined to a front part of the panel opening 8a of the side panel 8 on the outer side in the vehicle width direction. With a cross section in a horizontal direction formed in a top hat shape opening inward in the vehicle width direction, the rear pillar outer part 9a extends upward from an upper part of the wheel well outer part 7b and forms a rear pillar 9 having a closed cross section extending in an up-down direction together with the side panel 8. It will be appreciated that a top hat shape as described herein indicates an upside-down squared U-shape with horizontal extensions extending from a bottom of each end of the upside-down squared U-shape so as to form an outline of a top hat. It will be further appreciated that a squared U-shape as described herein indicates a U-shape in which the bottom of the U-shape is flat rather than rounded, and is not intended to indicate that each side of the U-shape is equal in length.

As shown in FIG. 7, a right and left pair of roof side rails 10 extending in the front-rear direction, and D-pillars 11 that are continuously provided on the rear side of these roof side rails 10 and extend to a rear end of the vehicle in a direction oriented rearward and inclined downward, are provided on both sides of an upper part of the vehicle body. Each of the roof side rails 10 and the D-pillars 11 has a cross section perpendicular to an extension direction thereof formed as a rectangular closed cross section.

On the inner side in the vehicle width direction of the right and left pair of roof side rails 10, a roof cross member 12 that couples together these roof side rails 10 in the vehicle width direction is provided. The roof cross member 12 has a cross section perpendicular to the vehicle width direction formed as a rectangular closed cross section.

The rear pillar 9 is coupled at an upper end to the roof side rail 10. The roof cross member 12 is provided so as to correspond in the front-rear direction to the positions in inner surfaces in the vehicle width direction of the roof side rails 10 at which the rear pillars 9 are coupled.

As shown in FIG. 3, a front and rear pair of front side reinforcement 13 and rear side reinforcement 14 (also referred to as a "damper-side side reinforcement") is provided on inner surfaces in the vehicle width direction of the wheel well inner part 7a and the side panel 8. The front side reinforcement 13 is provided so as to correspond to a front half of the wheel well inner part 7a, while the rear side reinforcement 14 is provided so as to correspond to a rear half of the wheel well inner part 7a, more specifically at the same position as the damper supporting part 65 in the vehicle front-rear direction.

The front side reinforcement 13 extends upward from a substantially middle position in the up-down direction in the wheel well inner part 7a, and extends to a position at which the front side reinforcement 13 overlaps the rear pillar 9 in the up-down direction as seen in a side view of the vehicle, with an upper end of the front side reinforcement 13 facing a lower half part of the rear pillar 9 on the inner side in the vehicle width direction. The rear side reinforcement 14 extends upward from a substantially middle position in the up-down direction in the wheel well inner part 7a, on the rear side of the panel opening 8a, and is coupled at an upper end to the D-pillar 11.

Each of the front side reinforcement 13 and the rear side reinforcement 14 has a cross section in the horizontal direction formed in a top hat shape opening outward in the vehicle width direction, and these side reinforcements form rectangular closed cross sections extending in the up-down direction together with the wheel well inner part 7a and the side panel 8.

Figure 4:
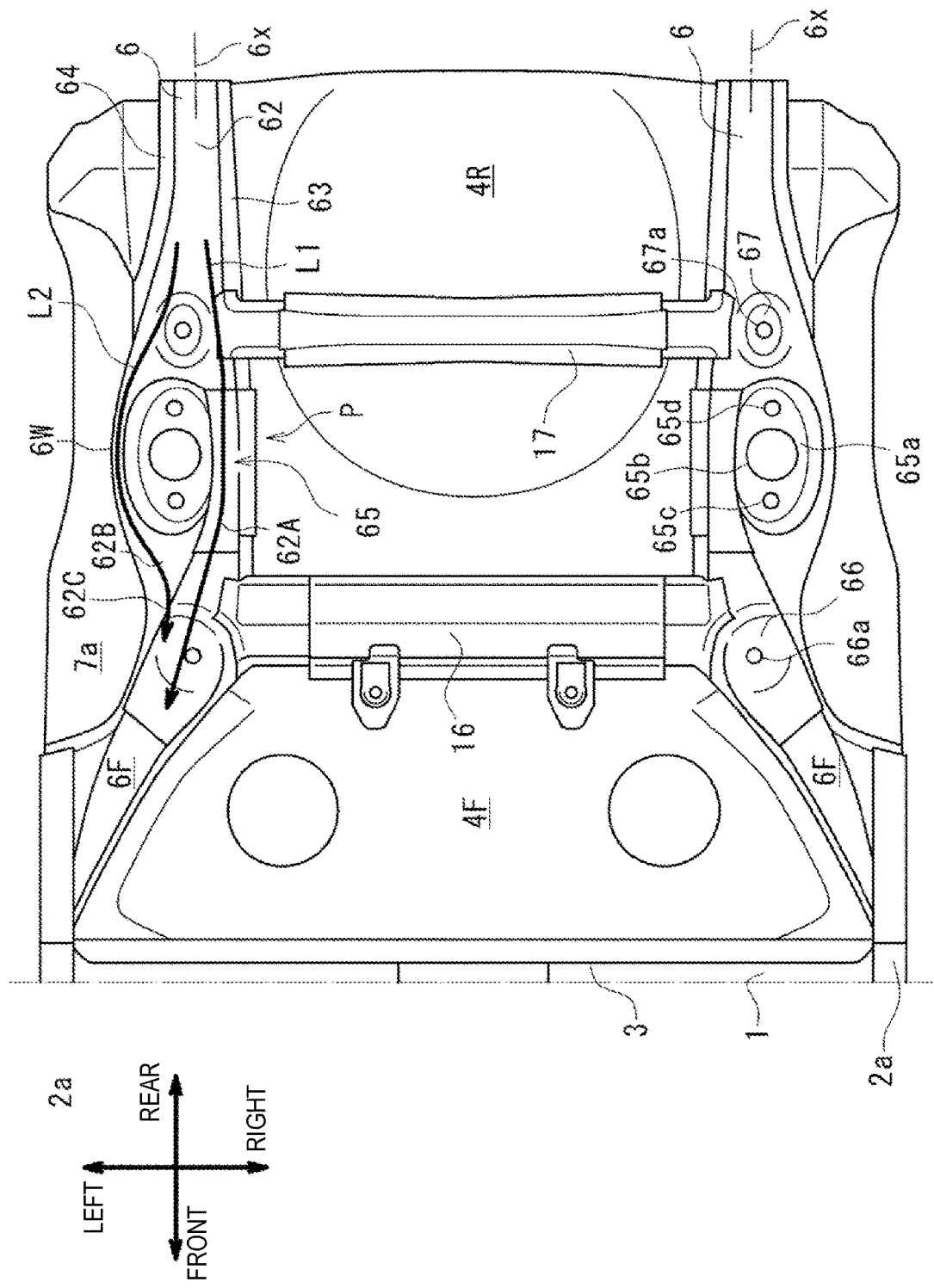
FIG. 4 is a bottom view of the rear vehicle body structure shown in FIG. 1.

The rising portion 4S of the rear floor panel 4 is provided with an upper and lower pair of rear cross member upper part 15 and rear cross member lower part 16 that covers the rising portion 4S on the upper and lower sides. Referring also to FIG. 1 and FIG. 4, each of the upper and lower pair of rear cross member upper part 15 and rear cross member lower part 16 extends in the vehicle width direction and couples together the right and left pair of frame members 6 in the vehicle width direction.

The rear cross member upper part 15 has a cross section perpendicular to the vehicle width direction formed in a top hat shape opening downward, and forms a closed cross section extending in the vehicle width direction together with the rear floor panel 4. The rear cross member lower part 16 has a cross section perpendicular to the vehicle width direction formed in a top hat shape opening upward, and forms a rectangular closed cross section extending in the vehicle width direction together with the rear floor panel 4.

As seen in a top view, the closed cross section formed by the rear cross member upper part 15 and the closed cross section formed by the rear cross member lower part 16 at least partially overlap each other.

Moreover, a spare tire pan cross member 17 is provided in the rear-floor rear part 4R, along a lower surface of the recess 4a. Referring also to FIG. 4, the spare tire pan cross member 17 couples together the right and left pair of frame members 6 in the vehicle width direction. The spare tire pan cross member 17 has a cross section perpendicular to the vehicle width direction formed in a top hat shape opening upward, and forms a rectangular closed cross section extending in the vehicle width direction together with the rear-floor rear part 4R (recess 4a).

In the following, a structure around each of the frame members 6 will be described in detail. As the rear vehicle body structure V is symmetrical in the right-left direction, the following description will be made based mainly on the configuration on the right side of the vehicle.

Frame Member

As shown in FIG. 2 to FIG. 4, the frame member 6 has an upper and lower pair of frame walls, frame upper wall 61 and frame lower wall 62, extending in the front-rear direction, and an inner and outer pair of frame walls, frame inner wall 63 and frame outer wall 64, that are provided opposite each other in the vehicle width direction and connect the frame upper wall 61 and the frame lower wall 62 to each other in the up-down direction at inner ends and outer ends of the frame upper wall 61 and the frame lower wall 62 in the vehicle width direction.

As shown in FIG. 4, the frame lower wall 62 has a depressed part 65 at an intermediate part, specifically at a substantially middle position, in the front-rear direction that is formed by depressing the frame lower wall 62 upward at a substantially center part in the vehicle width direction. The damper 92 provided in the rear suspension 91 (see FIG. 8 to FIG. 10) is inserted into the depressed part 65 from below and supported in the up-down direction, and thus the depressed part 65 is formed as a damper supporting part.

The damper supporting part 65 has an elliptical shape elongated in the front-rear direction as seen in a bottom view. In a top surface 65a of the damper supporting part 65, a damper insertion hole 65b extending through the top surface 65a in the up-down direction is formed at a center portion, and bolt insertion holes 65c, 65d extending through the top surface 65a in the up-down direction are formed on the front and rear sides of the damper insertion hole 65b. The frame member 6 has a wide part 6W that is formed at a position P at which the damper supporting part 65 is formed (depression-corresponding position) and that is widened outward in the vehicle width direction compared with the rest of the frame member 6.

Figure 8:
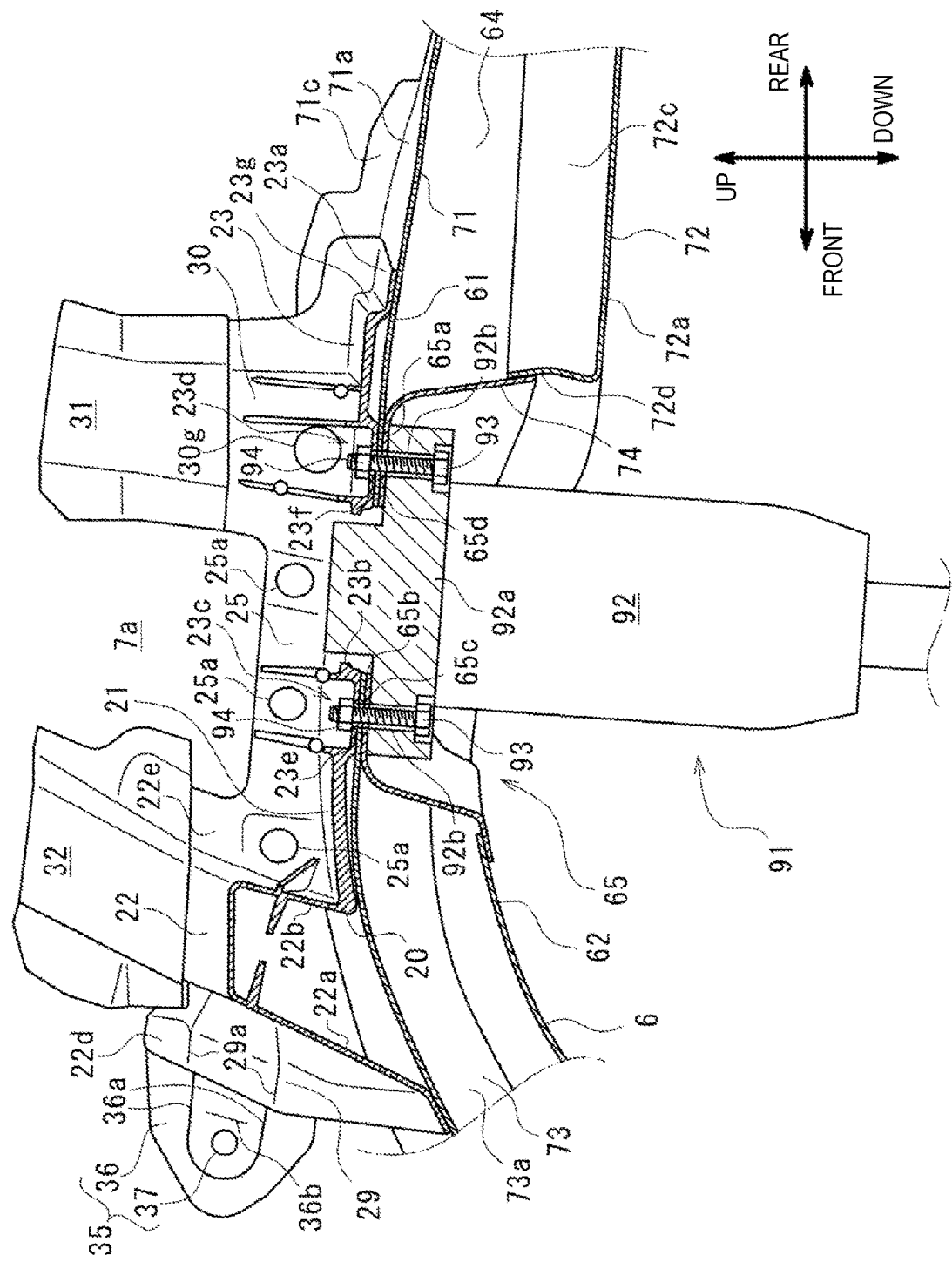
FIG. 8 is a sectional view taken along line VIII-VIII of FIG. 2.

FIG. 8 is a sectional view taken along line VIII-VIII of FIG. 2, specifically a view of a section of the damper supporting part 65 in the front-rear direction passing through the centers of the damper insertion hole 65b and the front and rear pair of bolt insertion holes 65c, 65d, showing the damper supporting part 65 along with the damper 92 mounted thereon. As shown in FIG. 8, the frame lower wall 62 is depressed upward at the damper supporting part 65 so as to abut against the frame upper wall 61 from below.

Figure 9:
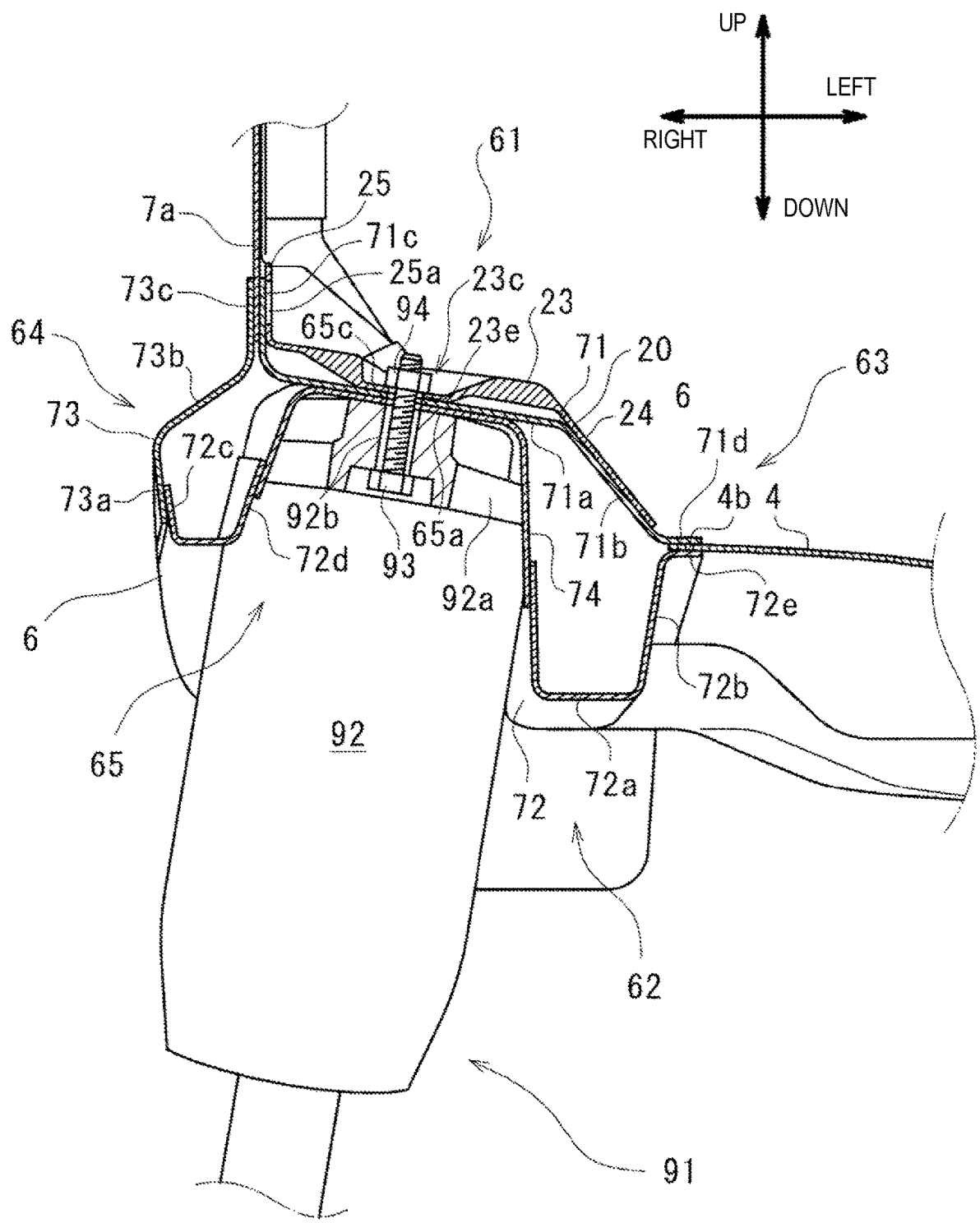
FIG. 9 is a sectional view taken along line IX-IX of FIG. 2.
Figure 10:
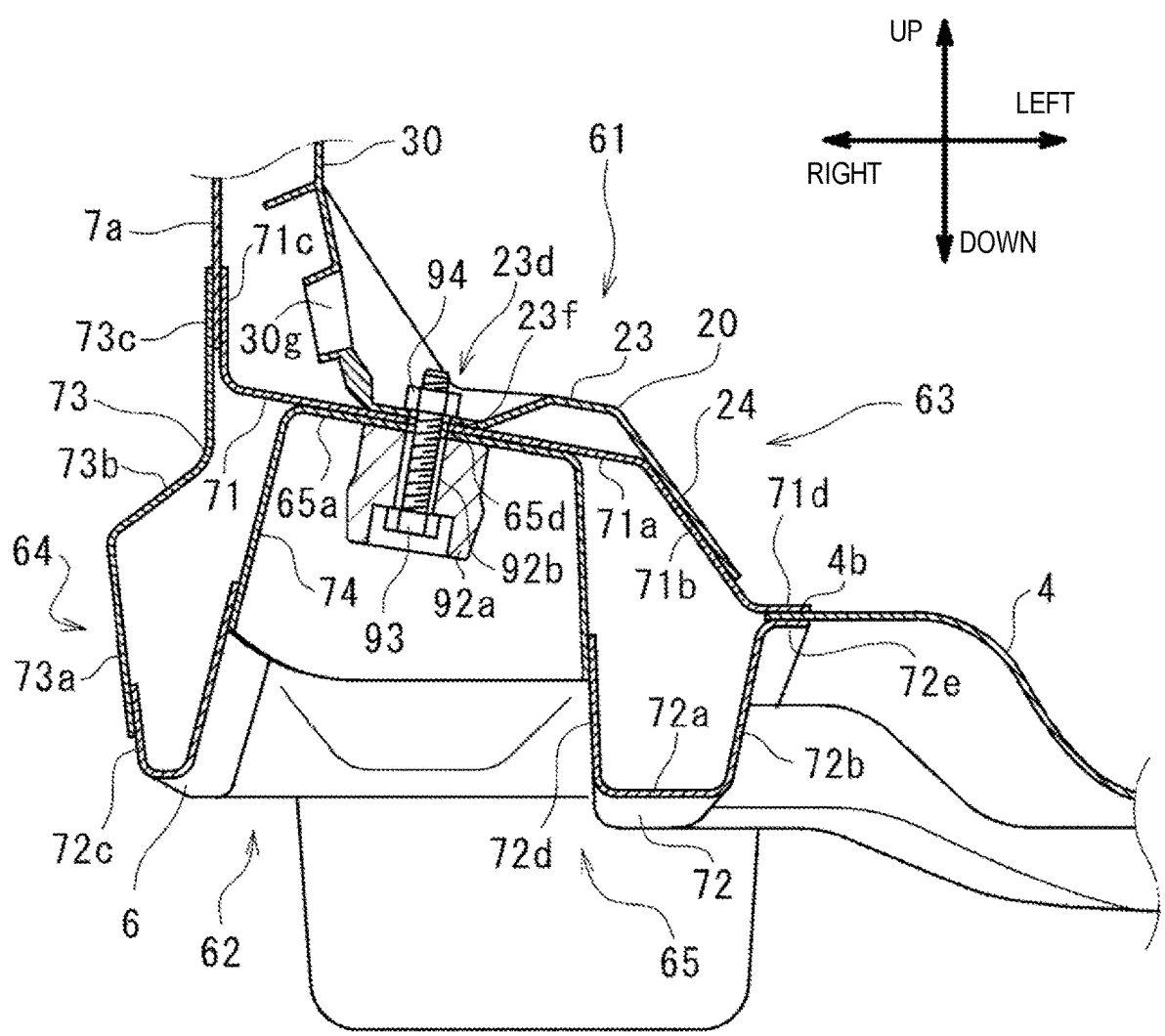
FIG. 10 is a sectional view taken along line X-X of FIG. 2.

FIG. 9 and FIG. 10 are sectional views taken along line IX-IX and line X-X, respectively, of FIG. 2, specifically views of sections in the vehicle width direction of the damper supporting part 65 at the bolt insertion holes 65c, 65d, respectively, showing the damper supporting part 65 along with the damper 92 mounted thereon. As shown in FIG. 9 and FIG. 10, as the damper supporting part 65 is formed in the frame member 6, the frame member 6 is forked into two branches, one on each side of the damper supporting part 65 in the vehicle width direction.

Accordingly, as shown in FIG. 4, a load path of a rear-end collision load transmitted through the depression-corresponding position P of the frame member 6 to the front side of the vehicle in a rear-end collision is forked into two branches, i.e., two load paths L1, L2, at the depression-corresponding position P.

In the rear vehicle body structure V of this embodiment, the frame member 6 is provided with the depressed part 65 so that the frame member 6 functions to support the damper as described above. Accordingly, on each side of the rear part of the vehicle body, almost the entire frame member 6 (i.e., the part thereof extending in the vehicle front-rear direction) is installed at a position offset inward in the vehicle width direction, compared with a conventional configuration in which the frame member, the damper supporting part, and the wheel well inner part are separately installed from the inner side toward the outer side in the vehicle width direction.

Specifically, in this embodiment, a central axis 6x (see FIG. 2) of the frame member 6 along a longitudinal direction thereof (vehicle front-rear direction) is set at a position farther on the inner side in the vehicle width direction than in the conventional configuration. Therefore, the amount of offset inward in the vehicle width direction relative to the side sill 2 is larger than that in the above-described conventional configuration.

The frame member 6 except for a front part in the vehicle front-rear direction extends substantially parallel to the vehicle front-rear direction. On the other hand, the front part of the frame member 6 forms an inclined part 6F that extends frontward while being inclined outward in the vehicle width direction, and a front end of this inclined part 6F (i.e., the front end of the frame member 6) is joined to the rear portion of the side sill 2.

Thus, the front part of the frame member 6 is formed as the inclined part 6F and the front end of this inclined part 6F is connected to the side sill 2. This makes it possible to smoothly connect the front end of the frame member 6 to the rear portion of the side sill 2, and thereby efficiently transmit a rear-end collision load from the frame member 6 to the side sill 2 in a rear-end collision, even in a configuration in which, as in this embodiment, the frame member 6 is installed at a position offset inward in the vehicle width direction relative to the side sill 2 due to the depressed part 65 being provided in the frame member 6 as described above.

The frame lower wall 62 is provided with a front suspension component mount portion 66 and a rear suspension component mount portion 67 respectively on the front side and the rear side of the damper supporting part 65. The front suspension component mount portion 66 and the rear suspension component mount portion 67 have bolt insertion holes 66a, 67a, respectively, to allow rear suspension components (not shown), such as a suspension cross member and a trailing arm, to be mounted and supported through suspension mounting bolts (not shown), and are formed so as to protrude downward into a shape of a mount base.

The rear cross members 15, 16 are joined to the right and left pair of frame members 6 on the inner side in the vehicle width direction, at positions corresponding to the front suspension component mount portions 66 in the vehicle front-rear direction. The spare tire pan cross member 17 is joined to the right and left pair of frame members 6 on the inner side in the vehicle width direction, at positions corresponding to the rear suspension component mount portions 67 in the front-rear direction.

In this embodiment, the inclined part 6F corresponds, in the vehicle front-rear direction, to a part from a position between the depression-corresponding position P and the front suspension component mount portion 66 (in other words, the position of a front end of the wide part 6W) to the front end of the frame member 6.

The front portion of the inclined part 6F overlaps a rear portion of the side sill inner portion 2a, specifically a portion from a rear end of the side sill inner portion 2a to a point short of the rear side of the kick-up portion 3, in the vehicle front-rear direction. At this overlapping portion, the front portion of the inclined part 6F is joined to the rear portion of the side sill inner portion 2a on the inner side in the vehicle width direction.

The wide part 6W formed in the frame member 6 is formed by widening the frame member 6 outward in the vehicle width direction. As a result, the central axis 6x (see FIG. 2) of the frame member 6 can be set farther on the outer side in the vehicle width direction (the side of the side sill 2 in the vehicle width direction) at the depression-corresponding position P (wide part 6W), compared with when the wide part 6W is not formed, and an adverse effect of providing the depressed part 65 in the frame member 6 can be thereby mitigated.

Specifically, providing the depressed part 65 in the frame member 6 causes an increase in the amount of offset of the frame member 6 inward in the vehicle width direction relative to the side sill 2, thereby hindering the smooth transmission of a rear-end collision load from the frame member 6 to the side sill 2 in a rear-end collision. As a result, the frame member 6 and the side sill member may deform in such a manner that the amount of overlap between the front portion of the frame member 6 and the rear portion of the side sill 2 in the vehicle front-rear direction increases, i.e., that the frame member and the side sill member form a Z-shape as seen in a plan view. This adverse effect can be reduced.

The frame outer wall 64 of the frame member 6 is formed so as to bulge gently outward in the vehicle width direction, at a part from a position on the rear side of the rear suspension component mount portion 67 to a position in the immediate vicinity of and on the rear side of the front suspension component mount portion 66, such that the wide part 6W is most widened outward in the vehicle width direction at the depression-corresponding position P.

On the other hand, the frame inner wall 63 is formed substantially in a straight line along the vehicle front-rear direction, from the rear end of the frame member 6 to the rear end of the inclined part 6F, without being bulged inward in the vehicle width direction also at the wide part 6W, i.e., including the depression-corresponding position P, in the vehicle front-rear direction.

Thus, the wide part 6W is formed by bulging only the frame outer wall 64 of the frame member 6 at a part around the depression-corresponding position P in the vehicle front-rear direction so as to protrude toward the wheel well inner part 7a. As seen in a bottom view, the geometric center of the depressed part 65 is set at a center portion in the vehicle width direction of the wide part 6W.

Figure 5:
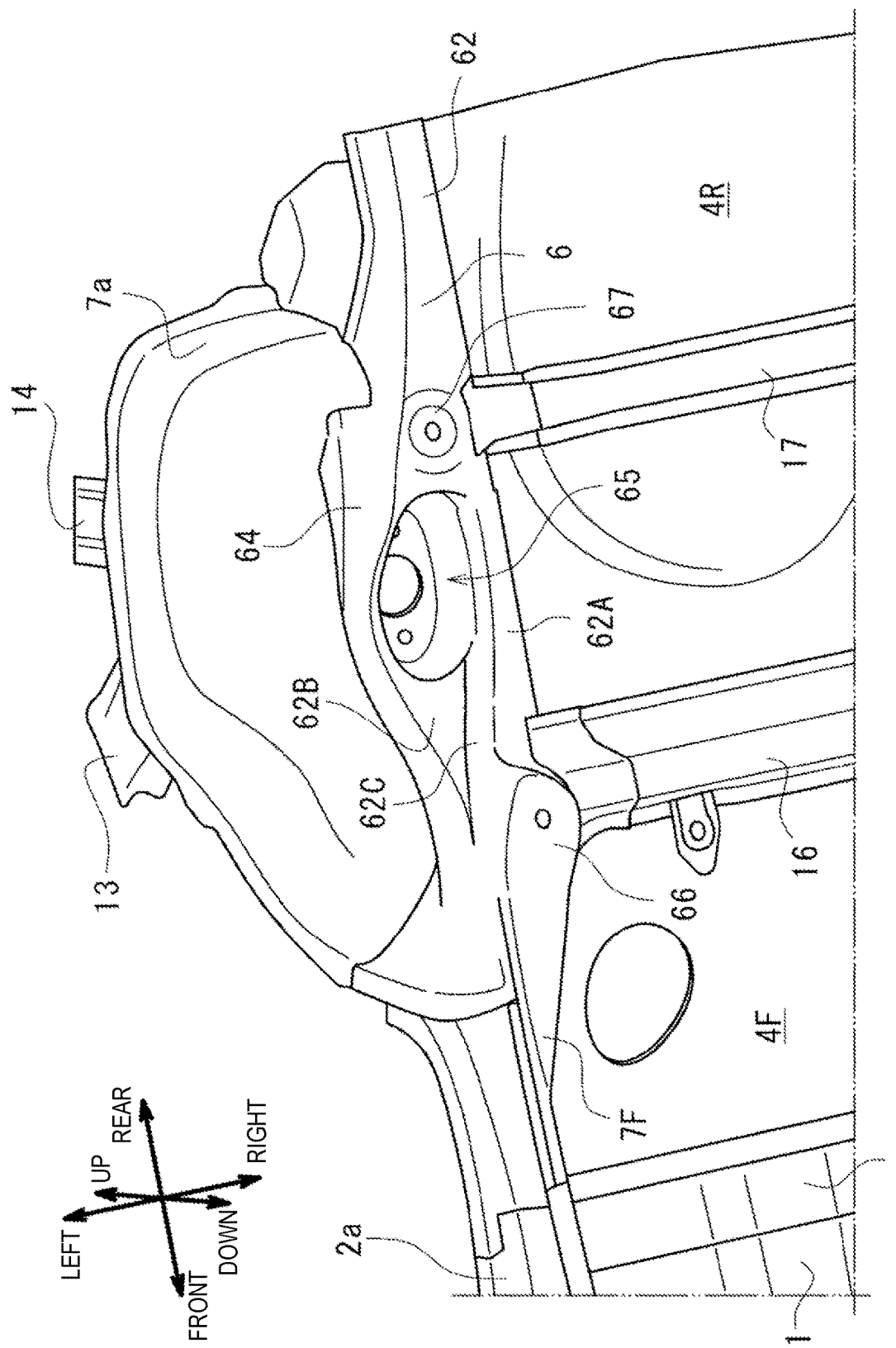
FIG. 5 is a perspective view of main parts of the rear vehicle body structure shown in FIG. 1, as seen from a lower outer side in a vehicle width direction.

As shown in FIG. 4 and FIG. 5, the frame lower wall 62 is formed such that a part on the front side of the rear suspension component mount portion 67 is located at a lowered level so as to form a step toward the outer side in the vehicle width direction. Specifically, the frame lower wall 62 has a lower wall inner part 62A that is located on the inner side in the vehicle width direction of the depressed part 65 and forms part of the load path L1, and a lower wall outer part 62B that extends frontward by circumventing the depressed part 65 from the outer side in the vehicle width direction and forms part of the load path L2. The lower wall outer part 62B is located above the lower wall inner part 62A.

The lower wall inner part 62A and the lower wall outer part 62B are connected to each other in the up-down direction by a lower vertical wall 62C on the front side of the depressed part 65. The lower wall inner part 62A extends frontward on the inner side in the vehicle width direction of the depressed part 65 while widening outward in the vehicle width direction, and is formed so as to be continuous with a lower surface of the inclined part 6F. The lower vertical wall 62C is continuous with the frame outer wall 64 at a rear portion of the inclined part 6F. On the other hand, the lower wall outer part 62B extends frontward by curving so as to circumvent the depressed part 65 from the outer side in the vehicle width direction, and is connected on the outer side in the vehicle width direction to the frame outer wall 64 at a substantially middle position in the front-rear direction in the inclined part 6F.

Thus, as shown in FIG. 4, in the load path L2 passing through the outer side in the vehicle width direction, a collision load due to a rear-end collision is transmitted frontward so as to circumvent the depressed part 65 toward the outer side in the vehicle width direction, while in the load path L1 passing through the inner side in the vehicle width direction, the load is transmitted frontward in a straight line along the longitudinal direction of the frame member 6 (vehicle front-rear direction) without circumventing the depressed part 65.

As described above, the lower wall inner part 62A forming part of the load path L1 is located at a raised level compared with the lower wall outer part 62B forming part of the load path L2, so that the cross section of the load path L1 is larger than that of the load path L2. Moreover, the load path L1 extends in a straight line. These factors are combined to produce a promoting effect on the efficient transmission of a collision load due to a rear-end collision to the side sill 2 through the load path L1.

Of the frame member 6, the lower wall inner part 62A forming part of the load path L1 is curved outward in the vehicle width direction while extending toward the inclined part 6F. The rigidity of the frame member 6 at this curved part against bending in the vehicle width direction is increased by the lower wall outer part 62B that is joined to this curved part along the entire length thereof on the outer side in the vehicle width direction.

As shown in FIG. 8 to FIG. 10, in this embodiment, the frame member 6 has: a frame upper part 71 forming the frame upper wall 61 and an upper half of the frame inner wall 63; a frame lower part 72 forming the frame lower wall 62 and lower halves of the frame inner wall 63 and the frame outer wall 64; a frame outer part 73 forming the frame outer wall 64; and a frame intermediate member 74 forming the depressed part 65.

The frame upper part 71, the frame lower part 72, the frame outer part 73, and the frame intermediate member 74 are integrally formed by pressing a steel sheet or formed by joining together a plurality of members as appropriate.

The frame upper part 71 has: an upper surface 71a extending substantially horizontally in the front-rear direction; an inner surface inclined portion 71b extending from an inner end in the vehicle width direction of the upper surface 71a in a direction oriented downward and inclined inward in the vehicle width direction; and an outer flange 71c extending upward from an outer end in the vehicle width direction of the upper surface 71a. An inner flange 71d extending inward in the vehicle width direction is provided so as to extend from a lower end of the inner surface inclined portion 71b.

As shown in FIG. 9 and FIG. 10, the damper 92 is mounted in such a posture as to be slightly inclined outward in the vehicle width direction while extending downward. Accordingly, a flange 92a provided at an upper end of the damper 92 is slightly inclined downward while extending inward in the vehicle width direction. Therefore, as will be described later, the frame upper wall 61 (i.e., the upper surface 71a of the frame upper part 71) to which the damper 92 is mounted through the flange 92a is also slightly inclined downward while extending inward in the vehicle width direction.

The frame lower part 72 has: a lower surface 72a extending substantially horizontally; an inner surface 72b extending upward from an inner end in the vehicle width direction of the lower surface 72a; and an outer surface 72c extending upward from an outer end in the vehicle width direction of the lower surface 72a. The lower surface 72a has an opening 72d formed at the depression-corresponding position P (see FIG. 4) that extends through the lower surface 72a in the up-down direction and is raised into a burring shape. At an upper end of the inner surface 72b, an inner flange 72e extending inward in the vehicle width direction is provided so as to extend from the upper end.

The frame outer part 73 has: an outer surface 73a extending in a substantially vertical direction and the front-rear direction; an outer surface inclined portion 73b extending from an upper end of the outer surface 73a in a direction oriented upward and inclined inward in the vehicle width direction; and an outer flange 73c extending upward from an upper end of the outer surface inclined portion 73b.

The frame intermediate member 74 has a shape of a cup opening downward.

These members are joined together as follows: The frame intermediate member 74 is inserted from below to an inner side of the opening 72d formed in the lower surface 72a of the frame lower part 72, and the frame intermediate member 74 is joined at a lower end to an upper end of the opening 72d raised into a burring shape.

The frame upper part 71 and the frame lower part 72 are joined together in the form of three layers with their respective inner flanges 71d, 72e sandwiching an outer end 4b in the vehicle width direction of the rear floor panel 4 in the up-down direction. In this state, a top wall of the frame intermediate member 74 joined to the frame lower part 72 abuts against the upper surface 71a of the frame upper part 71 from below.

The outer surface 73a of the frame outer part 73 is joined at a lower end to an upper end of the outer surface 72c of the frame lower part 72 on the outer side in the vehicle width direction. The frame outer part 73 and the frame upper part 71 are joined together in the form of three layers with their respective outer flanges 73c, 71c sandwiching the lower end of the wheel well inner part 7a in the vehicle width direction.

Thus, the frame upper wall 61 is mainly formed by the upper surface 71a of the frame upper part 71. The frame lower wall 62 is mainly formed by the lower surface 72a of the frame lower part 72 and the frame intermediate member 74. The frame inner wall 63 is mainly formed by the inner surface inclined portion 71b of the frame upper part 71 and the inner surface 72b of the frame lower part 72. The frame outer wall 64 is mainly formed by the outer surface 72c of the frame lower part 72, and the outer surface 73a and the outer surface inclined portion 73b of the frame outer part 73.

The damper insertion hole 65b and the bolt insertion holes 65c, 65d formed in the top surface 65a of the damper supporting part 65 are formed so as to extend through the upper surface 71a of the frame upper part 71 and the top wall of the frame intermediate member 74 in the up-down direction.

Reinforcing Member

As shown in FIG. 1, the reinforcing member 20 is an aluminum-alloy member having a reinforcing member main body 21 and a reinforcing member coupling part 22 that are integrally formed by aluminum die casting. The reinforcing member main body 21 reinforces the damper supporting part 65 of the frame member 6, and the reinforcing member coupling part 22 couples together the front side reinforcement 13 and the rear cross member upper part 15 on the front side of the damper supporting part 65.

Figure 12:
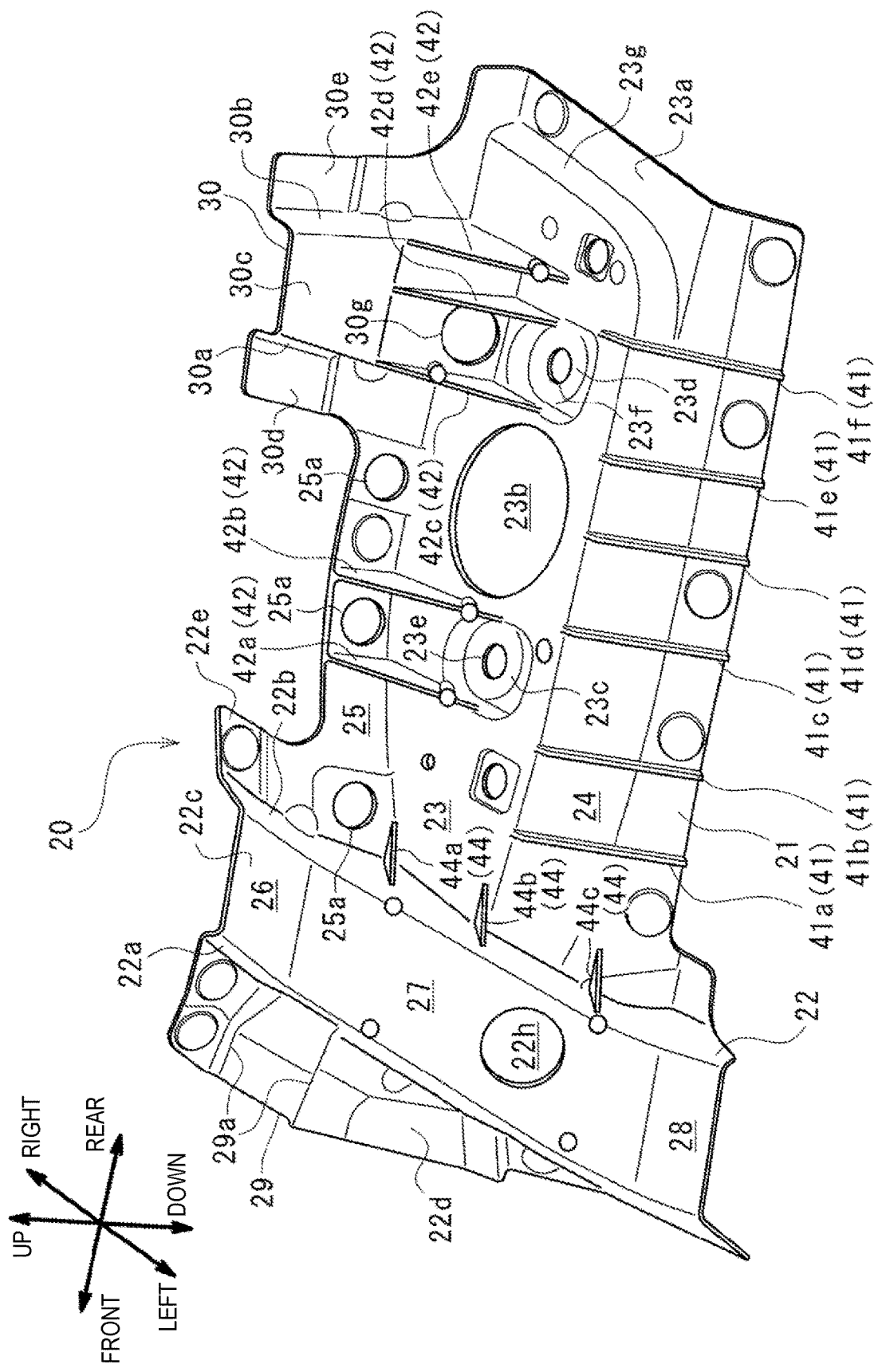
FIG. 12 is a perspective view of the reinforcing member.

Referring also to FIG. 12, the reinforcing member main body 21 has a length at least corresponding to the damper supporting part 65 in the vehicle front-rear direction, and integrally has: a reinforcing member upper wall 23 extending above the frame member 6, parallel to the frame member 6 and substantially horizontally in the front-rear direction; a reinforcing member inner wall 24 extending from an inner end in the vehicle width direction of the reinforcing member upper wall 23 in a direction oriented downward and inclined inward in the vehicle width direction; and an outer flange 25 extending upward from an outer end in the vehicle width direction of the reinforcing member upper wall 23.

Referring also to FIG. 8 to FIG. 10, the reinforcing member upper wall 23 extends in the front-rear direction substantially parallel to the frame upper wall 61, at a position on the upper side of and at a distance from the frame upper wall 61, and has a width (a length in the vehicle width direction) corresponding to the opposite frame upper wall 61. Thus, as seen in a top view, an inner edge in the vehicle width direction of the reinforcing member upper wall 23 extends in the front-rear direction, while an outer edge in the vehicle width direction thereof bulges outward in the vehicle width direction, at the position at which the reinforcing member upper wall 23 faces the wide part 6W of the frame member 6.

The reinforcing member upper wall 23 has a rear flange 23a that is formed at a rear end at a lowered level, with a vertical wall 23g interposed between the rear flange 23a and the rest of the reinforcing member upper wall 23. As shown in FIG. 8, the rear flange 23a is joined to the frame upper wall 61 by abutting against the frame upper wall 61 on the upper side.

Moreover, as seen in a plan view, the reinforcing member upper wall 23 has a damper insertion hole 23b that is formed so as to extend through the reinforcing member upper wall 23 at a position corresponding to the damper insertion hole 65b formed in the frame member 6, and that communicates with the damper insertion hole 65b in the up-down direction.

Furthermore, the reinforcing member upper wall 23 has a front damper mount recess 23c and a rear damper mount recess 23d that are formed by recessing portions of the reinforcing member upper wall 23 on the front and rear sides of the damper insertion hole 23b, at positions corresponding to the bolt insertion holes 65c, 65d formed in the frame member 6, and that abut against the frame upper wall 61 to form fastening seat surfaces.

At bottoms of the front damper mount recess 23c and the rear damper mount recess 23d, damper fastening bolt insertion holes 23e, 23f are respectively formed so as to extend through the reinforcing member upper wall 23 and respectively communicate in the up-down direction with the bolt insertion holes 65c, 65d formed in the frame member 6.

As shown in FIG. 8, to mount the damper 92 to the damper supporting part 65, first, the damper 92 is inserted into the damper supporting part 65 from below such that the flange 92a provided at the upper end of the damper 92 abuts against the top surface 65a of the damper supporting part 65 from below.

Next, fastening bolts 93 are inserted into a front and rear pair of mounting holes 92b that is formed so as to extend through the flange 92a of the damper 92 in the up-down direction. Then, the fastening bolts 93 are sequentially inserted from below into the bolt insertion holes 65c, 65d formed in the frame member 6 and the bolt insertion holes 23e, 23f formed in the reinforcing member upper wall 23, and are fastened with fastening nuts 94 from above at the bottoms of the front damper mount recess 23c and the rear damper mount recess 23d. As a result, the damper 92 is inserted and fixed (retained) in the damper supporting part 65.

Thus, a front and rear pair of suspension fastening portions for fastening and fixing the damper 92 to the damper supporting part 65 is formed at the bottoms of the front damper mount recess 23c and the rear damper mount recess 23d, and the reinforcing member upper wall 23 of the reinforcing member 20 is fastened along with the damper 92 at these suspension fastening points. The reinforcing member upper wall 23 is thereby mounted to the frame upper wall 61.

As shown in FIG. 9 and FIG. 10, the reinforcing member inner wall 24 abuts against the inner surface inclined portion 71b of the frame upper part 71 of the frame inner wall 63 on the inner side in the vehicle width direction, and is joined to a lower end of the inner surface inclined portion 71b at a plurality of points spaced apart from one another in the front-rear direction.

As shown in FIG. 8 and FIG. 9, the outer flange 25 abuts against the outer flange 71c of the frame upper part 71 on the inner side in the vehicle width direction, and is joined to the outer flange 71c at a plurality of points spaced part from one another in the front-rear direction. The outer flange 25 has a plurality of openings 25a each formed between two of these points adjacent to each other in the front-rear direction at which the outer flange 25 is joined to the outer flange 71c. The opening 25a has a circular shape, for example, and is used as an opening for allowing access of welding jig and tool to join together the outer flange 71c of the frame upper part 71, the lower end of the wheel well inner part 7a, and the outer flange 73c of the frame outer part 73 in the form of three layers so as to avoid the reinforcing member 20.

As shown in FIG. 12, the reinforcing member main body 21 has a reinforcement-shaped part 30 integrally formed therein that is located so as to overlap the damper supporting part 65 of the frame member 6 in the front-rear direction as seen in a side view of the vehicle and protrudes farther upward than the outer flange 25. More specifically, the reinforcement-shaped part 30 is located so as to at least partially overlap the suspension fastening portion in the front-rear direction as seen in a side view of the vehicle. Referring also to FIG. 1 and FIG. 3, the reinforcement-shaped part 30 is coupled to a lower end of the rear side reinforcement 14 through a first coupling member 31.

The reinforcement-shaped part 30 has a cross section in the horizontal direction formed in a squared U-shape that opens outward in the vehicle width direction, and has a front and rear pair of front surface 30a and rear surface 30b, and an inner surface 30c connecting these surfaces to each other in the front-rear direction at inner ends in the vehicle width direction. The reinforcement-shaped part 30 further has an outer front flange 30d extending frontward from an outer end in the vehicle width direction of the front surface 30a, and an outer rear flange 30e extending rearward from an outer end in the vehicle width direction of the rear surface 30b. Lower ends of the outer front flange 30d and the outer rear flange 30e are continuous with the outer flange 25 of the reinforcing member main body 21.

As shown in FIG. 1, the reinforcing member coupling part 22 integrally has: a coupling part upper portion 26 extending in the up-down direction; a coupling part inclined portion 27 extending from a lower end of the coupling part upper portion 26 in a direction oriented inward in the vehicle width direction and inclined downward; and a coupling part lower portion 28 extending inward in the vehicle width direction from an inner end in the vehicle width direction of the coupling part inclined portion 27. The coupling part upper portion 26 is coupled to the lower end of the front side reinforcement 13 through a second coupling member 32. The coupling part lower portion 28 is coupled to an outer end in the vehicle width direction of the rear cross member upper part 15 through a third coupling member 33.

The coupling part inclined portion 27 crosses the frame member 6 in the vehicle width direction from above. Referring also to FIG. 6, the coupling part inclined portion 27 extends preferably at an inclination angle of about 45 degrees relative to the up-down direction so as to couple together the coupling part upper portion 26 and the coupling part lower portion 28 like a bracing strut.

As shown in FIG. 12, the reinforcing member coupling part 22 has a cross section orthogonal to an extension direction thereof formed in a squared U-shape that opens toward the vehicle outer side, and has a front and rear pair of front surface 22a and rear surface 22b, and a vehicle cabin inner surface 22c connecting these surfaces to each other in the front-rear direction at ends on the vehicle cabin inner side.

Specifically, the coupling part upper portion 26 has a cross section in the horizontal direction formed in a squared U-shape that opens outward in the vehicle width direction, and abuts against the wheel well inner part 7a on the inner side in the vehicle width direction. Thus, a closed cross section extending in the up-down direction is formed between the coupling part upper portion 26 and the wheel well inner part 7a.

Referring also to FIG. 8, a cross section of the coupling part inclined portion 27 orthogonal to a direction oriented inward in the vehicle width direction and inclined downward is formed in a squared U-shape that opens in a direction oriented outward in the vehicle width direction and inclined downward. The coupling part inclined portion 27 abuts against the wheel well inner part 7a on the inner side in the vehicle width direction, and is joined to the frame member 6 from above or on the inner side in the vehicle width direction. Thus, a closed cross section extending in a direction oriented inward in the vehicle width direction and inclined downward is formed between the coupling part inclined portion 27 on one side and the wheel well inner part 7a and the frame member 6 on the other side.

The coupling part lower portion 28 has a cross section orthogonal to the vehicle width direction formed in a squared U-shape that opens downward, and abuts against the rear floor panel 4 from above. Thus, a closed cross section extending in the vehicle width direction is formed between the coupling part lower portion 28 and the rear floor panel 4.

In the rear vehicle body structure V, therefore, a vehicle body annular framework part having a closed cross sectional structure that is annularly continuous as seen in a front view is formed, as shown in FIG. 6 and FIG. 7, by the rear cross member upper and lower parts 15, 16, the rear floor panel 4, the frame members 6, the reinforcing member coupling parts 22 of the reinforcing members 20, the second and third coupling members 32, 33, the wheel well inner parts 7a, the front side reinforcements 13, the side panels 8, the rear pillars 9, the roof side rails 10, and the roof cross member 12.

As shown in FIG. 12, the reinforcing member coupling part 22 further has an outer front flange 22d that extends frontward from an outer end in the vehicle width direction of the front surface 22a, and an outer rear flange 22e that extends rearward from an outer end in the vehicle width direction of the rear surface 22b and is continuous with the outer flange 25 of the reinforcing member main body 21.

As shown in FIG. 8, a rear seat supporting member mount portion 29 is formed at an upper portion of the reinforcing member coupling part 22, and a rear seat supporting part 35 protruding frontward is mounted on the rear seat supporting member mount portion 29. Referring also to FIG. 12, the rear seat supporting member mount portion 29 extends frontward from the front surface 22a to the outer front flange 22d, and has a cross section orthogonal to the front-rear direction formed in a squared U-shape that opens outward in the vehicle width direction.

The rear seat supporting member mount portion 29 has an upper and lower pair of base joint ridges 29a for forming the squared U-shaped cross section that is formed at an inner end in the vehicle width direction of the squared U-shaped cross section and extends in the front-rear direction.

The rear seat supporting part 35 is formed by pressing a steel sheet, and has a base portion 36 of which a base end (rear end) is joined to the rear seat supporting member mount portion 29, and a pivot portion 37 provided on a leading end side (front end side) of the base portion 36.

With a cross section orthogonal to the front-rear direction formed in a top hat shape opening outward in the vehicle width direction, the base portion 36 extends frontward along the wheel well inner part 7a from the base end joined to the rear seat supporting member mount portion 29, and forms a closed cross section extending in the front-rear direction together with the wheel well inner part 7a. The closed cross section formed by the base portion 36 is closed at the leading end (front end) by an arc-shaped wall centered at the pivot portion 37.

The base portion 36 has an upper and lower pair of base portion ridges 36a for forming the top hat-shaped cross section that is formed at an inner end in the vehicle width direction of the base portion 36 and extends in the front-rear direction.

Specifically, the base portion 36 is provided on the front side of a center portion in the front-rear direction of the wheel well inner part 7a. As seen in the top view of FIG. 2, a base end-side part of the base portion 36 extends along the wheel well inner part 7a in a direction oriented frontward and inclined outward in the vehicle width direction, and then extends in the front-rear direction around the pivot portion 37. Specifically, the base portion 36 has a base portion up-down-direction ridge 36b extending in the up-down direction which is formed on the rear side of the pivot portion 37 and at which the extension direction of the base portion 36 as seen in a top view changes from the direction oriented frontward and inclined outward in the vehicle width direction to the frontward direction, and the rigidity of the base portion 36 in the up-down direction and the front-rear direction is increased by this base portion up-down-direction ridge 36b.

The pivot portion 37 is formed such that a pivot shaft 90c (see FIG. 7) provided in a seat back 90a of the rear seat 90 is fixed thereto through a fastening nut, for example, and the seat back 90a is thereby supported so as to be able to recline and fold forward relative to the pivot shaft 90c.

Figure 11:
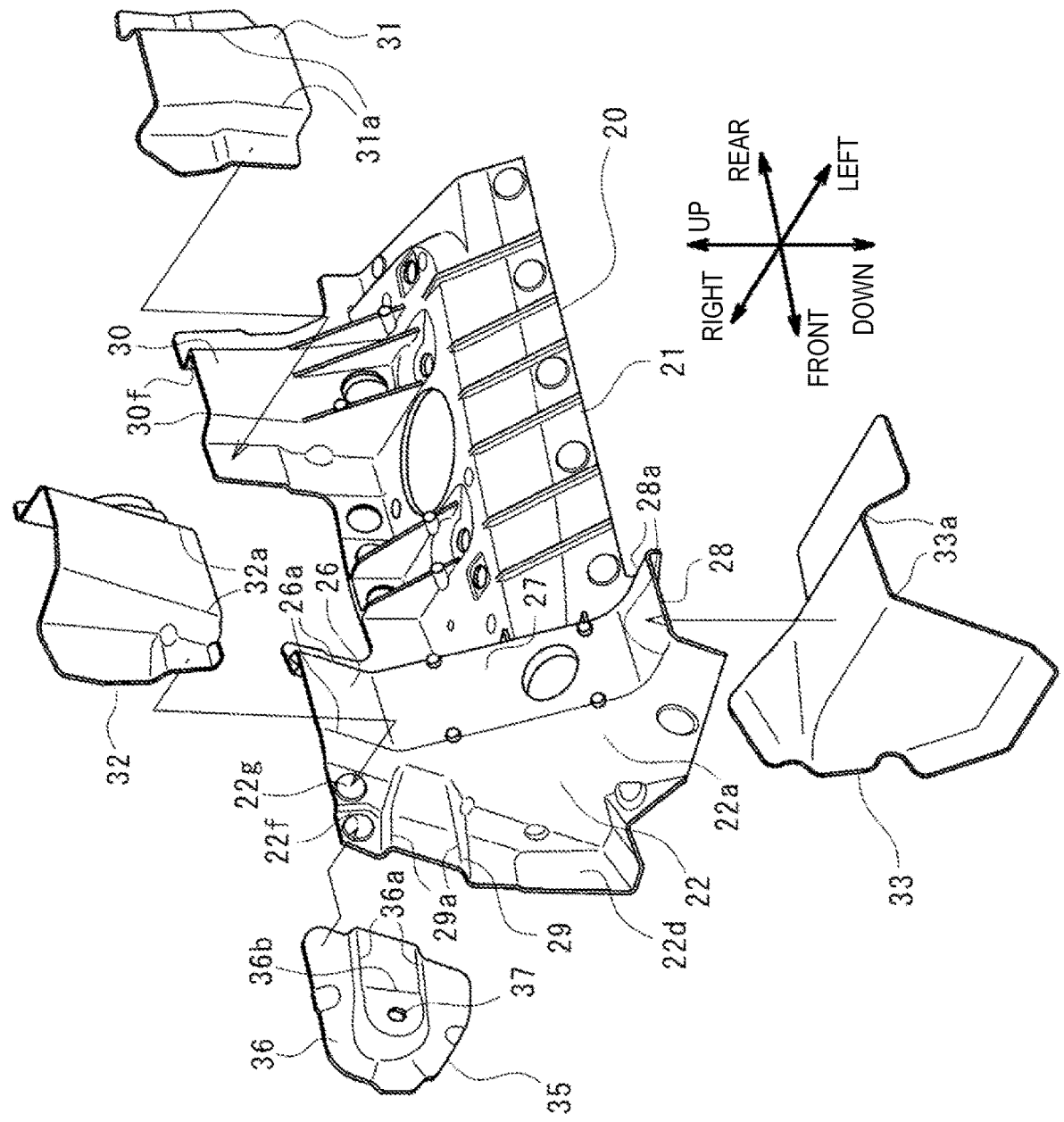
FIG. 11 is an exploded perspective view showing parts around a reinforcing member.

As shown in FIG. 3 and FIG. 11, the first coupling member 31 extends in the up-down direction on the inner side in the vehicle width direction of the reinforcement-shaped part 30 of the reinforcing member 20 and the rear side reinforcement 14 so as to rest on both the reinforcement-shaped part 30 and the rear side reinforcement 14, and has a cross section in the horizontal direction formed in a top hat shape opening outward in the vehicle width direction. The first coupling member 31 is joined at a lower end to the reinforcement-shaped part 30 of the reinforcing member 20, and is joined at an upper end to the wheel well inner part 7a in the form of three layers with the lower end of the rear side reinforcement 14 sandwiched therebetween. The reinforcement-shaped part 30 and the rear side reinforcement 14 are formed such that the cross sections thereof perpendicular to the up-down direction are continuous with each other through the first coupling member 31.

In other words, the reinforcement-shaped part 30, the first coupling member 31, and the rear side reinforcement 14 respectively have, on the inner side in the vehicle width direction, front and rear pairs of reinforcement-shaped part ridges 30f, first coupling part ridges 31a, and rear reinforcing part ridges 14a for forming the top hat-shaped cross section or the squared U-shaped cross section, and are configured such that these edges are substantially continuous with one another in the up-down direction.

As shown in FIG. 3 and FIG. 11, the second coupling member 32 extends in the up-down direction on the inner side in the vehicle width direction of the coupling part upper portion 26 of the reinforcing member coupling part 22 and the front side reinforcement 13 so as to rest on both the coupling part upper portion 26 and the front side reinforcement 13, and has a cross section in the horizontal direction formed in a top hat shape opening outward in the vehicle width direction. The second coupling member 32 is joined at a lower end to the coupling part upper portion 26, and is joined at an upper end to the wheel well inner part 7a in the form of three layers with the lower end of the front side reinforcement 13 sandwiched therebetween. The coupling part upper portion 26 and the front side reinforcement 13 are formed such that the cross sections thereof perpendicular to the up-down direction are continuous with each other through the second coupling member 32.

In other words, the coupling part upper portion 26, the second coupling member 32, and the front side reinforcement 13 respectively have, on the inner side in the vehicle width direction, front and rear pairs of coupling part upper portion ridges 26a, second coupling part ridges 32a, and front reinforcing part ridges 13a for forming the top hat-shaped cross section or the squared U-shaped cross section, and are formed such that these edges are substantially continuous with one another in the up-down direction.

As shown in FIG. 2 and FIG. 11, the third coupling member 33 extends in the vehicle width direction on the lower side of the coupling part lower portion 28 of the reinforcing member coupling part 22 and the rear cross member upper part 15 so as to rest on both the coupling part lower portion 28 and the rear cross member upper part 15, and has a cross section orthogonal to the vehicle width direction formed in a top hat shape opening downward. The third coupling member 33 is joined at an outer end in the vehicle width direction to the coupling part lower portion 28, and is joined at an inner end in the vehicle width direction to the outer end in the vehicle width direction of the rear cross member upper part 15. The coupling part lower portion 28 and the rear cross member upper part 15 are formed such that the cross sections thereof perpendicular to the vehicle width direction are continuous with each other through the third coupling member 33.

In other words, the coupling part lower portion 28, the third coupling member 33, and the rear cross member upper part 15 respectively have, at their upper ends, front and rear pairs of coupling part lower portion ridges 28a, third coupling part ridges 33a, and rear cross member ridges 15a for forming the top hat-shaped cross section or the squared U-shaped cross section, and are formed such that these edges are substantially continuous with one another in the vehicle width direction.

Therefore, the ridges of the front side reinforcement 13 and the rear cross member upper part 15 are substantially continuous with each other through the second and third coupling members 32, 33 and the reinforcing member coupling part 22, which increases the rigidity of the vehicle body annular framework part formed by these members.

As described above, the reinforcing member 20 is made of an aluminum alloy, while the first to third coupling members 31 to 33, the frame member 6, and the rear seat supporting part 35 joined to the reinforcing member 20 are formed by pressing a steel sheet. To join these members, therefore, riveting (e.g., self-piercing riveting, hereinafter referred to as "SPR") and not spot welding is used.

As joining by SPR requires special jig and tool, this process is preferably performed before the reinforcing member 20 is installed to the vehicle body, due to limitations of working space in the vehicle body. Specifically, it is preferable that the frame upper part 71, the first to third coupling members 31 to 33, and the rear seat supporting part 35 be joined to the reinforcing member 20 by SPR in advance to form a sub-assembly, and that then this sub-assembly be installed to members other than the frame member 6 and to the rear vehicle body structure, such as the wheel well inner part 7a, through the frame upper part 71, the first to third coupling members 31 to 33, and the rear seat supporting part 35 by appropriate joining means, such as spot welding.

As shown in FIG. 8, the reinforcing member 20 is fastened along with the damper 92 also at the front and rear pair of suspension fastening portions in the damper supporting part 65 as described above, and therefore is fixed to the frame upper wall 61 by fastening also at the front damper mount recess 23c and the rear damper mount recess 23d.

As shown in FIG. 11, at an upper portion of the outer front flange 22d of the reinforcing member coupling part 22, the base portion 36 of the rear seat supporting part 35 is joined by SPR to the outer front flange 22d on the outer side in the vehicle width direction, and the second coupling member 32 is joined to the outer front flange 22d by SPR, on the rear side of and adjacent to the base portion 36, on the inner side in the vehicle width direction.

Thus, in the reinforcing member coupling part 22, a base portion joint 22f at which the base portion 36 is joined by SPR on the outer side in the vehicle width direction, and a front reinforcement joint 22g at which the second coupling member 32 is joined by SPR on the inner side in the vehicle width direction, are provided at positions located close to each other and side by side in the front-rear direction.

Moreover, joining at the base portion joint 22f and the front reinforcement joint 22g is performed by SPR in different directions along the vehicle width direction. SPR is a joining method that cannot be used for multilayer joining of more than two sheets with an aluminum-alloy material sandwiched therebetween, which makes it necessary to separately perform joining at the base portion joint 22f and joining at the front reinforcement joint 22g. In this case, the reinforcing member 20 is configured such that the members are joined at the base portion joint 22f and the front reinforcement joint 22g by SPR in different directions along the vehicle width direction. This allows these joints to be disposed close to each other and can increase the strength of the joint portions.

The reinforcing member 20 has reinforcing ribs 41 to 46 formed on the vehicle cabin inner side and the vehicle cabin outer side thereof. As shown in FIG. 12, the reinforcing member inner wall 24 has a plurality of inner up-down-direction ribs 41 that is formed at intervals in the vehicle front-rear direction and protrudes toward the vehicle cabin inner side (the inner side in the vehicle width direction) and extends along the entire reinforcing member inner wall 24 in the up-down direction.

Specifically, six ribs, first to sixth inner up-down-direction ribs 41a to 41f, are formed in this order from the front side. The second inner up-down-direction rib 41b and the third inner up-down-direction rib 41c are formed so as to correspond in the front-rear direction to positions adjacent to each other on the front and rear sides of the front damper mount recess 23c formed in the reinforcing member upper wall 23. The fifth inner up-down-direction rib 41e and the sixth inner up-down-direction rib 41f are formed so as to correspond in the front-rear direction to positions adjacent to each other on the front and rear sides of the rear damper mount recess 23d formed in the reinforcing member upper wall 23.

Figure 13:
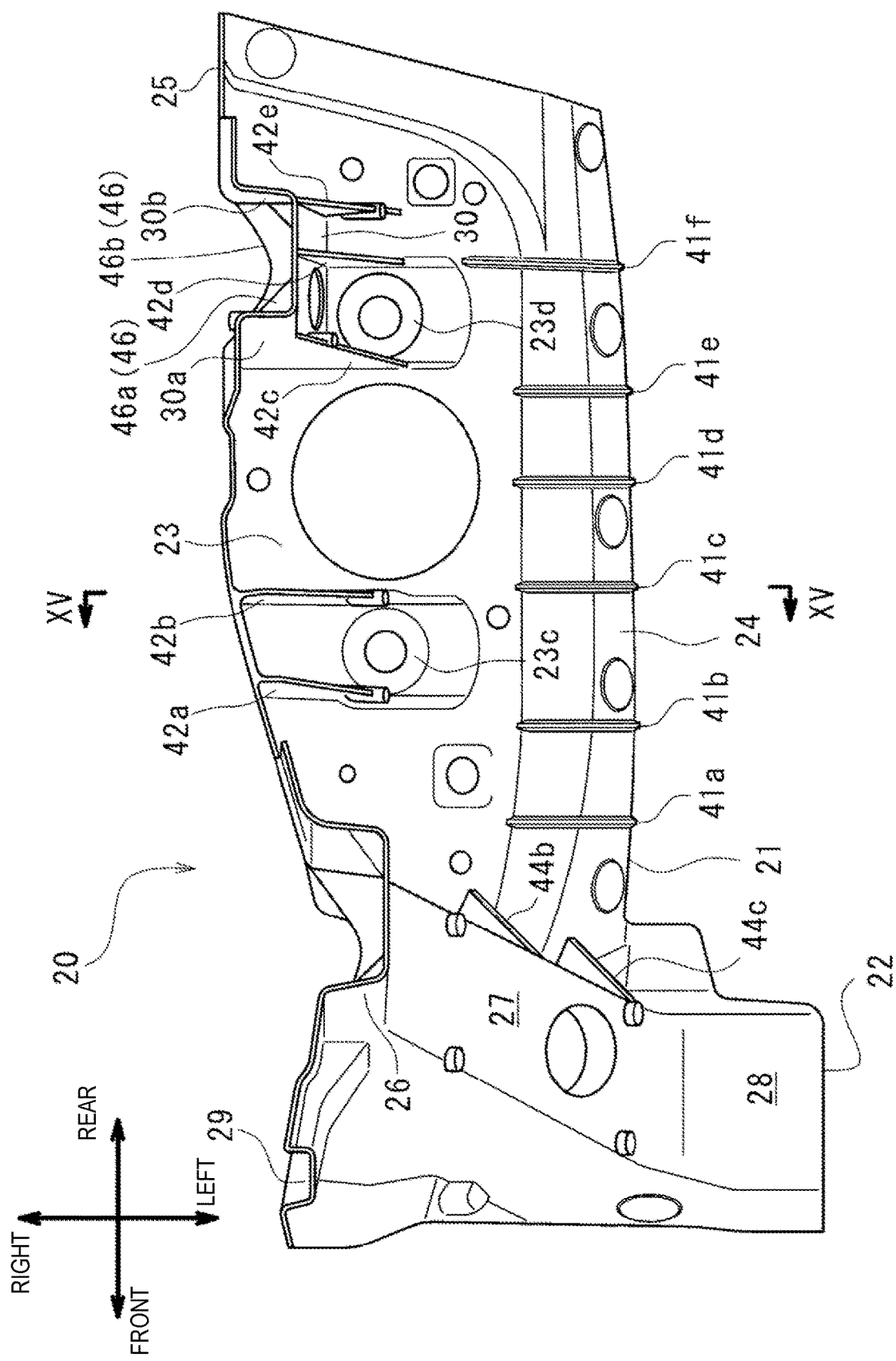
FIG. 13 is a top view of the reinforcing member shown in FIG. 1.

Referring also to FIG. 13, the reinforcing member upper wall 23 has a plurality of outer up-down-direction ribs 42 that is formed at intervals in the vehicle front-rear direction and protrudes toward the vehicle cabin inner side (upper side) and couples together the reinforcing member upper wall 23 and the outer flange 25 like bracing struts. Specifically, five ribs, first to fifth outer up-down-direction ribs 42a to 42e, are formed in this order from the front side. As each of these ribs extends downward from near an upper end of the outer flange 25, an amount of protrusion of the rib inward in the vehicle width direction increases gradually, with a lower end of the rib reaching a substantially center position in the vehicle width direction of the reinforcing member upper wall 23.

The first outer up-down-direction rib 42a and the second outer up-down-direction rib 42b are formed so as to correspond in the front-rear direction to positions adjacent to each other on the front and rear sides of the front damper mount recess 23c formed in the reinforcing member upper wall 23. The third outer up-down-direction rib 42c and the fourth outer up-down-direction rib 42d are formed so as to correspond in the front-rear direction to positions adjacent to each other on the front and rear sides of the rear damper mount recess 23d formed in the reinforcing member upper wall 23. The fifth outer up-down-direction rib 42e is formed at a position corresponding in the front-rear direction to the rear surface 30b of the reinforcement-shaped part 30.

Figure 14:
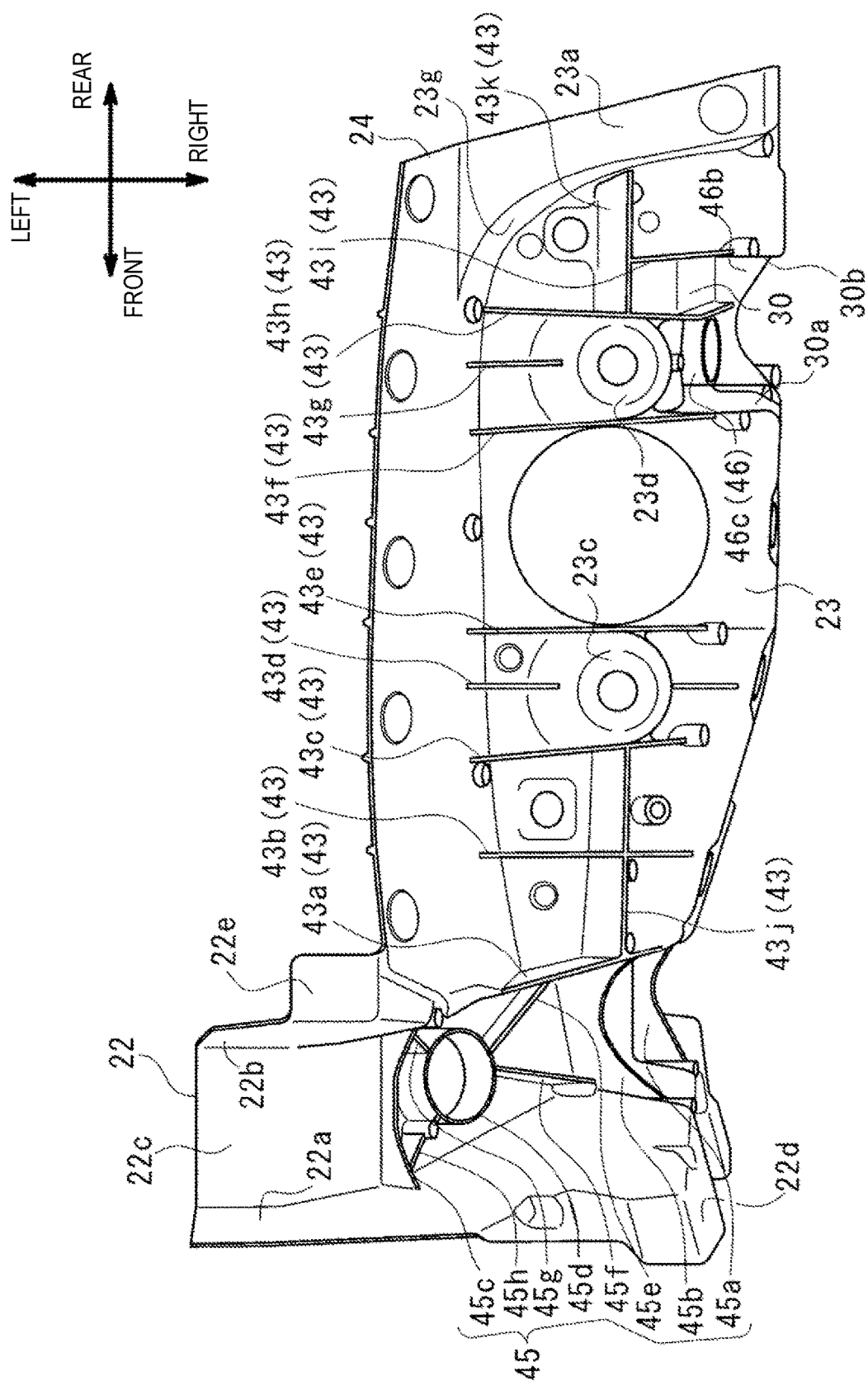
FIG. 14 is a bottom view of the reinforcing member shown in FIG. 1.

As shown in FIG. 14, the reinforcing member upper wall 23 has a plurality of upper wall lower ribs 43 protruding toward the vehicle cabin outer side (lower side). Specifically, nine ribs, first to ninth vehicle width-direction ribs 43a to 43i, extending in the vehicle width direction in this order from the front side, and a front and rear pair of tenth and eleventh front-rear-direction ribs 43j, 43k extending in the vehicle front-rear direction, are formed on the reinforcing member upper wall 23.

The second, third, fifth, sixth, and eighth vehicle width-direction ribs 43b, 43c, 43e, 43f, 43h are formed at positions corresponding in the front-rear direction to the first to third, fifth, and sixth inner up-down-direction ribs 41a to 41c, 41e, 41f (see FIG. 13), and inner ends in the vehicle width direction of these vehicle width-direction ribs are joined to the reinforcing member inner wall 24. Specifically, the second, third, fifth, sixth, and eighth vehicle width-direction ribs 43b, 43c, 43e, 43f, 43h are continuous with upper ends of the first to third, fifth, and sixth inner up-down-direction ribs 41a to 41c, 41e, 41f, respectively, through the reinforcing member inner wall 24.

The first vehicle width-direction rib 43a is formed at a position corresponding in the front-rear direction to the rear surface 22b of the reinforcing member coupling part 22. The ninth vehicle width-direction rib 43i is formed at a position corresponding in the front-rear direction to the rear surface 30b of the reinforcement-shaped part 30.

The fourth and seventh vehicle width-direction ribs 43d, 43g are formed at positions corresponding to center positions in the vehicle front-rear direction of the front damper mount recess 23c and the rear damper mount recess 23d, respectively, of the reinforcing member upper wall 23. Amounts of protrusion of the fourth and seventh vehicle width-direction ribs 43d, 43g are set such that these ribs protrude to substantially the same position as the positions in the up-down direction of the bottoms of the front damper mount recess 23c and the rear damper mount recess 23d.

The tenth front-rear-direction rib 43j extends in the vehicle front-rear direction at a position corresponding to a center position in the vehicle width direction of the front damper mount recess 23c, and couples together the first to third vehicle width-direction ribs 43a to 43c in the vehicle front-rear direction. The eleventh front-rear-direction rib 43k extends in the vehicle front-rear direction at a position corresponding to a center position in the vehicle width direction of the rear damper mount recess 23d, and couples together the eighth and ninth vehicle width-direction ribs 43h, 43i in the vehicle front-rear direction, and a rear end of the eleventh front-rear-direction rib 43k is joined to the vertical wall 23g on the front side of the rear flange 23a.

The upper wall lower ribs 43 are formed so as to be short enough not to come into contact with the frame upper wall 61 in a state where the reinforcing member 20 is installed on the frame member 6.

Figure 15:
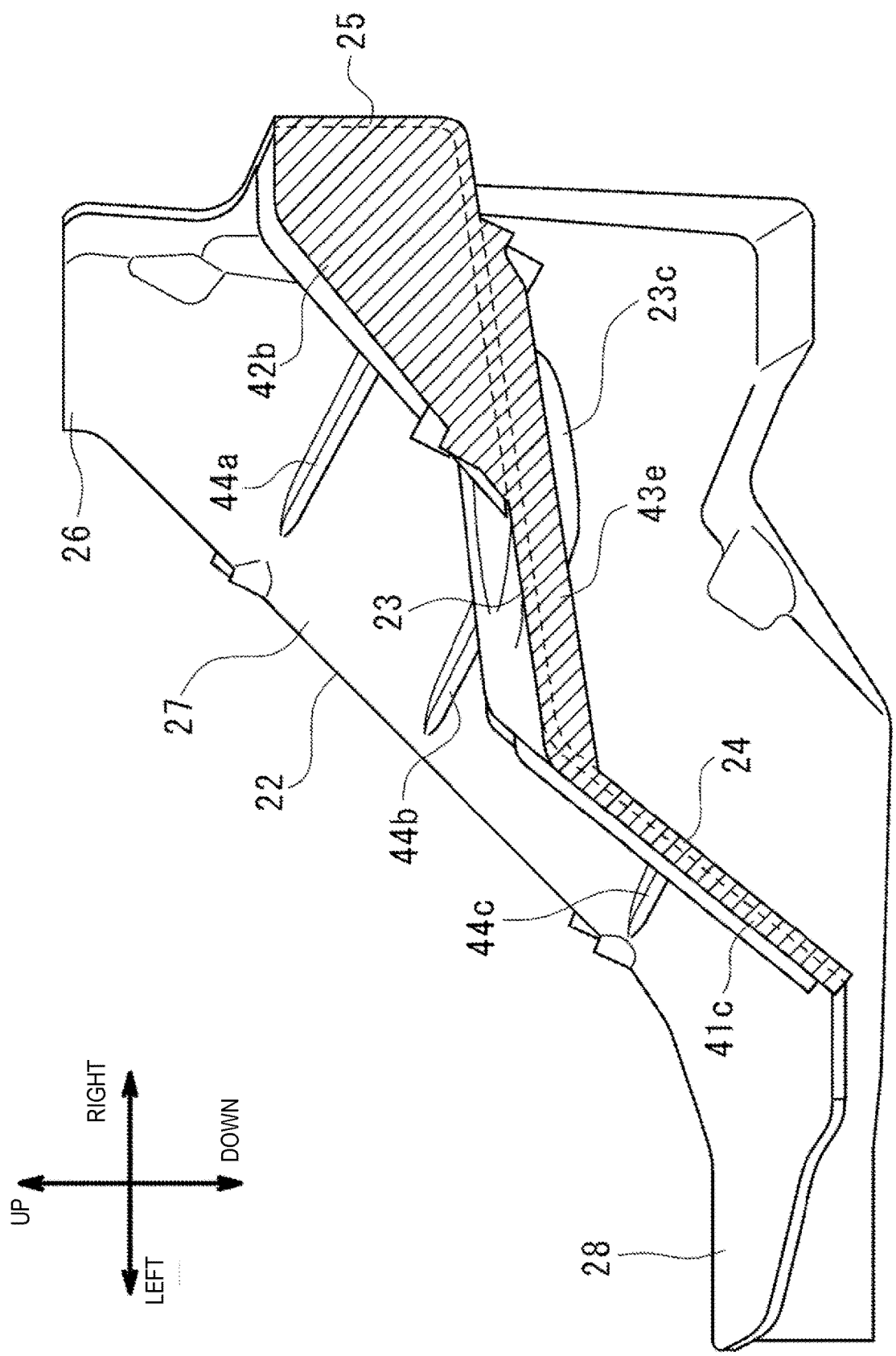
FIG. 15 is a sectional view taken along line XV-XV of FIG. 13.

As shown in FIG. 15, the inner up-down-direction rib 41 formed on the reinforcing member inner wall 24, the vehicle width-direction rib 43 formed on the reinforcing member upper wall 23, and the outer up-down-direction rib 42 formed from the reinforcing member upper wall 23 to the outer flange 25 are continuous with one another in the vehicle width direction from a vehicle cabin inner surface side to a vehicle cabin outer surface side of the reinforcing member 20. Specifically, the ribs 41 to 43 are formed continuously along the reinforcing member 20 in both the vehicle width direction and the up-down direction, at positions adjacent to one another on the front and rear sides of the front and rear pair of suspension fastening portions (i.e., the front damper mount recess 23c and the rear damper mount recess 23d).

As shown in FIG. 12, a plurality of front-rear-direction ribs 44 that couples together the reinforcing member main body 21 and the reinforcing member coupling part 22 in the front-rear direction is formed between the reinforcing member main body 21 and the reinforcing member coupling part 22. Specifically, three ribs, first to third front-rear-direction ribs 44a to 44c, extending in the front-rear direction are formed in this order from the upper side.

The first front-rear-direction rib 44a is formed so as to couple together the outer flange 25 of the reinforcing member 20 and the rear surface 22b of the reinforcing member coupling part 22 like a bracing strut. The second front-rear-direction rib 44b is formed so as to couple together the reinforcing member upper wall 23 and the rear surface 22b of the reinforcing member coupling part 22 like a bracing strut. The third front-rear-direction rib 44c is formed so as to couple together the reinforcing member inner wall 24 and the rear surface 22b of the reinforcing member coupling part 22 like a bracing strut.

The first front-rear-direction rib 44a is formed on the outer flange 25, at a position close to the reinforcing member upper wall 23, more specifically at a position close to the corner formed between the outer flange 25 and the reinforcing member upper wall 23. The second front-rear-direction rib 44b is formed on the reinforcing member upper wall 23, at a position close to the reinforcing member inner wall 24, more specifically at a position close to the edge formed between the reinforcing member upper wall 23 and the reinforcing member inner wall 24.

Thus, the first and second front-rear-direction ribs 44a, 44b are each provided close to a portion such as the corner or the edge of the reinforcing member main body 21 at which the rigidity is increased, and the supporting rigidity is thereby increased.

As shown in FIG. 14, a plurality of coupling part ribs 45 is formed on the inner side of the reinforcing member coupling part 22. Specifically, three ribs, first to third coupling part front-rear-direction ribs 45a to 45c, extending in the vehicle front-rear direction in this order from the upper side, a coupling part cylindrical rib 45d formed at a substantially middle position in the up-down direction between the second and third coupling part front-rear-direction ribs 45b, 45c, and first to fourth coupling part radial ribs 45e to 45h radially formed around the coupling part cylindrical rib 45d, are formed on the reinforcing member coupling part 22.

The first to third coupling part front-rear-direction ribs 45a to 45c are not formed so as to cover the entire inner side of the squared U-shaped cross section of the reinforcing member coupling part 22. Instead, these ribs have a shape formed by making an arc-shaped cutout in a squared U-shape as seen in a plan view, so as to add thickness to the corners of the squared U-shaped cross section like a bracing strut, and the thickness of these ribs is relatively small at a middle portion in the front-rear direction. Thus, the reinforcing member coupling part 22 is effectively reinforced against deformation of the cross section in the front-rear direction or the vehicle width direction, without a significant increase in the weight thereof.

The first to fourth coupling part radial ribs 45e to 45h extend radially toward the coupling part cylindrical rib 45d from joints between the second and third coupling part front-rear-direction ribs 45b, 45c and the front surface 22a and the rear surface 22b of the reinforcing member coupling part 22.

The reinforcing member coupling part 22 has an opening 22h that is formed so as to extend through the reinforcing member coupling part 22 in a thickness direction thereof and communicate with a cylindrical space formed by the coupling part cylindrical rib 45d on the inner side thereof. The work of joining together members located on the inner side of the reinforcing member coupling part 22 (e.g., the work of joining together the wheel well inner part 7a and the frame member 6 as shown in FIG. 10) can be performed through the opening 22h.

Figure 16:
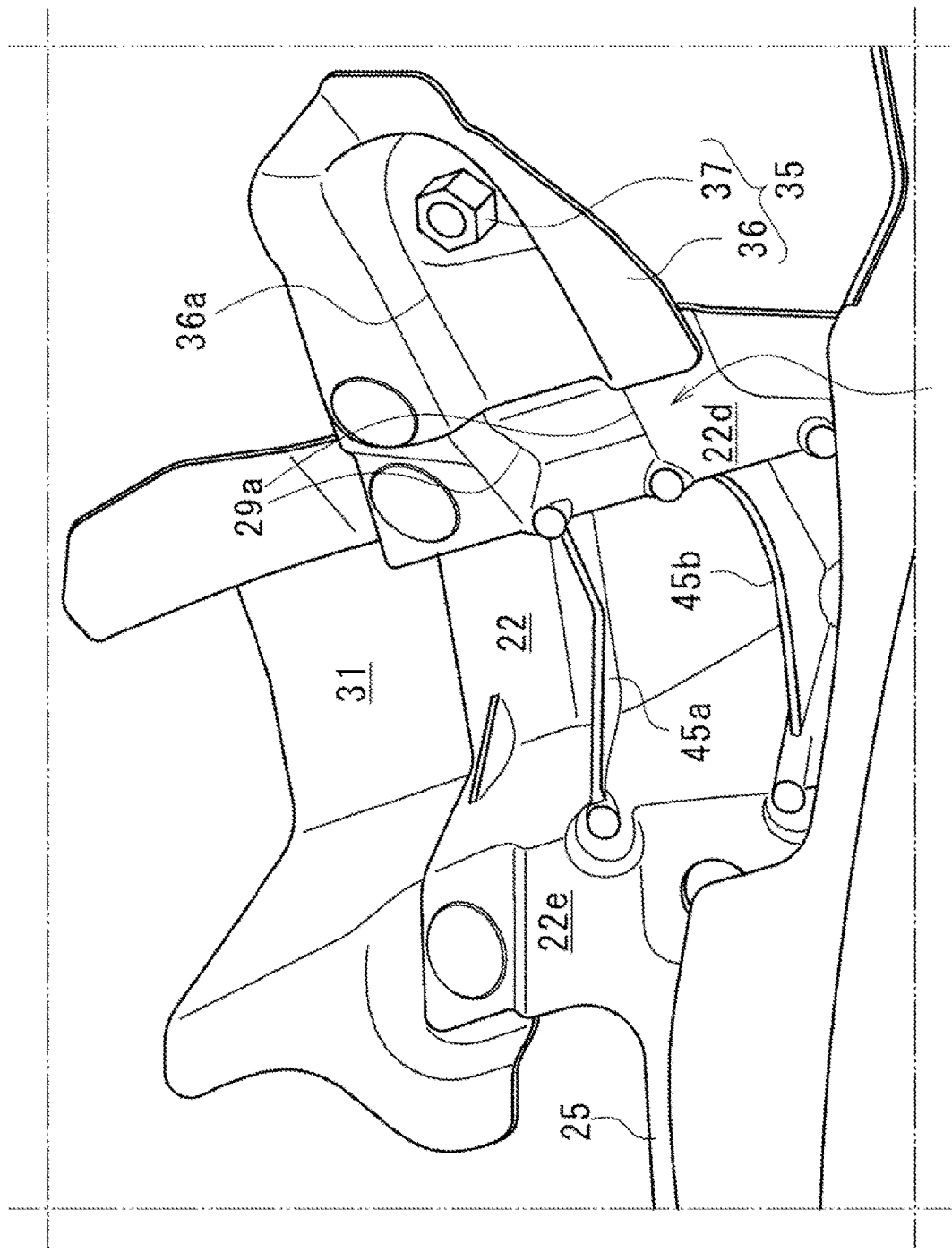
FIG. 16 is a perspective view showing a close-up of a part around a rear side reinforcement adapter as seen from the direction of arrow A of FIG. 2.

As shown in FIG. 16, the first and second coupling part front-rear-direction ribs 45a, 45b are formed so as to be continuous with an upper and lower pair of upper wall and lower wall that forms the rear seat supporting member mount portion 29. Specifically, the base portion ridges 36a of the base portion 36 of the rear seat supporting part 35, the base joint ridges 29a of the rear seat supporting member mount portion 29, and the first and second coupling part front-rear-direction ribs 45a, 45b are continuous with one another in the front-rear direction.

As shown in FIG. 13 and FIG. 14, a plurality of reinforcing part ribs 46 is formed on the inner side of the reinforcement-shaped part 30. Specifically, two ribs, first and second coupling part front-rear-direction ribs 46a, 46b, extending in the vehicle front-rear direction in this order from the upper side, and a reinforcing part cylindrical rib 46c formed on the lower side of these ribs are formed on the reinforcement-shaped part 30.

The first and second coupling part front-rear-direction ribs 46a, 46b are not formed so as to cover the entire inner side of the squared U-shaped cross section of the reinforcement-shaped part 30. Instead, these ribs have a shape formed by making an arc-shaped cutout in a squared U-shape as seen in a plan view, so as to add thickness to the corners of the squared U-shaped cross section like a bracing strut, and the thickness of these ribs is relatively small at a middle portion in the front-rear direction. Thus, the reinforcement-shaped part 30 is effectively reinforced against deformation of the cross section in the front-rear direction or the vehicle width direction, without a significant increase in the weight thereof.

The reinforcement-shaped part 30 has an opening 30g that is formed so as to extend through the reinforcement-shaped part 30 in a thickness direction thereof and communicate with a cylindrical space formed by the reinforcing part cylindrical rib 46c on the inner side thereof. The work of joining together members located on the inner side of the reinforcement-shaped part 30 (e.g., the work of joining together the wheel well inner part 7a and the frame member 6) can be performed through the opening 30g.

Rear Seat

As shown in FIG. 7, the rear seat 90 is a three-seater bench seat and includes a seat back 90a and a seat cushion 90b. FIG. 7 includes a transparent view of a portion of the right seat back 90a.

The seat back 90a is a so-called separate reclining seat back that is divided into three parts, for example, at a ratio of 4:2:4 in the vehicle width direction, and has a right seat back 90aR located on the right side, a left seat back 90aL located on the left side, and a center seat back 90aC located therebetween. By selectively folding these three seat backs 90a forward, one can increase the space of the luggage compartment according to preference.

The seat back 90a is supported on the rear vehicle body structure V so as to be able to recline and fold forward. Specifically, the right seat back 90aR includes the pivot shaft 90c protruding outward in the vehicle width direction at a lower right portion, and the pivot shaft 90c is fixed to the pivot portion 37 of the rear seat supporting part 35 that is provided so as to protrude frontward from the reinforcing member coupling part 22. Moreover, at a lower left portion of the right seat back 90aR, the pivot shaft 90c is fixed to a pivot portion provided in the rear cross member upper part 15. Thus, the seat back 90a is configured so as to be able to recline and fold forward relative to the pivot shaft 90c.

The left seat back 90aL is supported on the rear vehicle body structure V in the same manner, with the only difference being that the right and left sides are reversed. The center seat back 90aC is supported at lower right and left portions on pivot portions (not shown) provided in the rear cross member upper part 15, so as to be able to recline and fold forward.

The seat cushion 90b is fixed to the rear-floor front part 4F through brackets (not shown).

The rear vehicle body structure V according to this embodiment achieves the following effects.

(1) The reinforcing member 20 that reinforces the damper supporting part 65 can be used to couple together the rear cross member upper part 15 and the front side reinforcement 13 as well as to reinforce the coupling portion between the frame member 6 and the rear cross member upper part 15. Thus, the rigidity of the framework part of the rear vehicle body including the rear cross member upper part 15, the front side reinforcement 13, and the frame member 6 can be enhanced by the reinforcing member 20. Moreover, a load input from the damper 92 into the damper supporting part 65 is transmitted through the reinforcing member 20 to this framework part of the rear vehicle body, which enhances a sense of unity that an occupant feels with the motion of the vehicle body.

(2) Since the reinforcing member coupling part 22 has a cross section perpendicular to the extension direction thereof formed in a squared U-shape that opens toward the vehicle outer side, the reinforcing member coupling part 22 is likely to have high rigidity, and the rear cross member upper part 15 and the front side reinforcement 13 can be thereby firmly coupled together. Thus, the rigidity of the rear vehicle body can be effectively enhanced, and therefore a sense of unity that an occupant feels with the motion of the vehicle body can be further enhanced.

(3) The cross section of the framework part of the rear vehicle body from the rear cross member upper part 15 through the reinforcing member coupling part 22 to the front side reinforcement 13 can be formed as a closed cross section. Thus, the rigidity of the rear vehicle body can be effectively enhanced, and therefore a sense of unity that an occupant feels with the motion of the vehicle body can be further enhanced.

(4) The ridges for forming the top hat-shaped cross section or the squared U-shaped cross section extend continuously in the framework part of the rear vehicle body from the rear cross member upper part 15 through the reinforcing member coupling part 22 to the front side reinforcement 13. Thus, the rigidity of the rear vehicle body can be more effectively enhanced, and therefore a sense of unity that an occupant feels with the motion of the vehicle body can be even further enhanced.

(5) Since the coupling part inclined portion 27 extends in a straight line in a direction oriented outward in the vehicle width direction and inclined upward as seen in a front view of the vehicle body, the framework part of the rear vehicle body from the rear cross member upper part 15 through the reinforcing member coupling part 22 to the front side reinforcement 13 is likely to be restrained from undergoing so-called matchbox deformation in the vehicle width direction. Thus, the rigidity of the rear vehicle body in the vehicle width direction can be more effectively enhanced, and therefore a sense of unity that an occupant feels with the motion of the vehicle body can be even further enhanced.

(6) A load input from the damper 92 into the reinforcing member main body 21 is effectively transmitted through the front-rear-direction ribs 44 to the reinforcing member coupling part 22. Since the front-rear-direction ribs 44 extend so as to couple together the reinforcing member main body 21 and the reinforcing member coupling part 22 in the front-rear direction, especially a load in the front-rear direction among loads input from the damper 92 is effectively transmitted to the reinforcing member coupling part 22.

(7) The reinforcing member main body 21 has the reinforcing member upper wall 23, the reinforcing member inner wall 24, and the outer flange 25 and is formed in a step shape, which increases the rigidity of the reinforcing member main body 21. Moreover, the reinforcing member coupling part 22 is coupled to the surfaces of the step-shaped reinforcing member main body 21 through the respective front-rear-direction ribs 44. Thus, the coupling rigidity between the reinforcing member main body 21 and the reinforcing member coupling part 22 can be enhanced evenly along the extension direction of the reinforcing member coupling part 22. As a result, the rigidity of the reinforcing member 20 as a whole is enhanced, so that the rigidity of the rear vehicle body can be even more effectively enhanced, and therefore a sense of unity that an occupant feels with the motion of the vehicle body can be even further enhanced.

(8) Since the damper supporting part 65 is provided in the frame member 6, the rear vehicle body structure V involved in supporting the rear suspension 91 can be made compact in the vehicle width direction, compared with when the frame member 6 and the damper supporting part 65 are installed side by side in the vehicle width direction.

The reinforcing member 20 is mounted so as to rest on both the frame upper wall 61 and the frame inner wall 63, at the part of the frame member 6 at which the frame member 6 is forked into two branches by the damper supporting part 65. Since the reinforcing member 20 can increase the rigidity of the damper supporting part 65 in the up-down direction and the rigidity on the inner side in the vehicle width direction of the damper supporting part 65, deformation of the damper supporting part 65 in the up-down direction under a load input from the damper 92 in the up-down direction can be restrained. As a result, such deformation of the frame member 6 that the forked part thereof opens or closes in the vehicle width direction around the damper supporting part 65 can be restrained.

It is therefore possible to make the rear vehicle body structure V involved in supporting the rear suspension 91 compact in the vehicle width direction, and yet to restrain the forked part of the frame member 6 from deforming so as to open in the vehicle width direction under a load input from the damper 92.

(9) Since the suspension fastening portion of the damper supporting part 65 into which a load is input from the damper 92 are directly supported by the reinforcing member 20, the damper supporting part 65 can be more effectively reinforced. Thus, the reinforcing member 20 can work more effectively to restrain deformation of the damper supporting part 65 in the up-down direction, so that the aforementioned deformation of the forked part of the frame member 6 is further restrained.

(10) The vehicle width-direction ribs 43 extending in the vehicle width direction and the inner up-down-direction ribs 41 continuous with these ribs enhance the bending rigidity of the reinforcing member upper wall 23, the reinforcing member inner wall 24, and the cross section orthogonal to the front-rear direction formed by these walls. Thus, the aforementioned deformation of the forked part of the frame member 6 is further restrained.

(11) The outer flange 25 adds to the width of the reinforcing member 20 in the vehicle width direction as well as enhances the bending rigidity of the reinforcing member 20 in the cross section orthogonal to the front-rear direction. Thus, the aforementioned deformation of the forked part of the frame member 6 is further restrained.

(12) The outer up-down-direction ribs 42 continuous with the outer ends of the vehicle width-direction ribs 43 further enhance the bending rigidity of the cross section orthogonal to the front-rear direction formed by the reinforcing member upper wall 23 and the outer flange 25. Thus, the aforementioned deformation of the forked part of the frame member 6 is even further restrained.

(13) The outer up-down-direction ribs 42 and the vehicle width-direction ribs 43 are likely to work effectively for a load input from the damper 92 into the suspension fastening portion, and this load is likely to be dispersed from the reinforcing member upper wall 23 to the reinforcing member inner wall 24 and the outer flange 25 through these ribs 42, 43. Thus, the aforementioned deformation of the forked part of the frame member 6 is even further restrained.

(14) Since both the reinforcement-shaped part 30 and the rear side reinforcement 14 extend in the up-down direction and are formed such that the cross sections thereof are continuous with each other through the first coupling member 31, the rigidity of the damper supporting part 65 in the up-down direction is enhanced. As a result, especially a load in the up-down direction among loads input from the damper 92 into the damper supporting part 65 is transmitted through the reinforcement-shaped part 30 to the rear side reinforcement 14 and appropriately supported by these members. As a result, a load input into the damper supporting part 65 is effectively transmitted to the rear part of the vehicle body, and therefore a sense of unity that an occupant feels with the motion of the vehicle body is likely to be enhanced.

(15) The damper supporting part 65 is provided with the suspension fastening portion to which the damper 92 is fixed by fastening, and the reinforcement-shaped part 30 is located so as to at least partially overlap the suspension fastening portion in the front-rear direction as seen in a side view of the vehicle. Thus, the reinforcement-shaped part 30 is likely to function so as to more effectively provide support against a load input from the damper 92 into the suspension fastening portion.

(16) The outer up-down-direction ribs 42 can enhance the rigidity of a portion between the suspension fastening portion and the reinforcement-shaped part 30 in the up-down direction. Thus, a load in the up-down direction input from the damper 92 into the suspension fastening portion is more effectively transmitted to the reinforcement-shaped part 30, so that the reinforcement-shaped part 30 and the rear side reinforcement 14 are likely to function so as to more effectively provide support against the load.

(17) Among loads input from the damper 92 into the damper supporting part 65, a load in the up-down direction is appropriately supported by the reinforcement-shaped part 30 and the rear side reinforcement 14, and a load in the front-rear direction is appropriately supported by the reinforcing member coupling part 22, the rear cross member upper part 15, and the front side reinforcement 13. Thus, loads input from the damper 92 are even more appropriately supported, so that a sense of unity that an occupant feels with the motion of the vehicle body is likely to be even further enhanced.

(18) The rear seat supporting part 35 is provided in the framework part of the rear vehicle body formed by the rear cross member upper part 15, the front side reinforcement 13, and the reinforcing member coupling part 22. Thus, the rear seat 90 is more likely to move in conjunction with the motion of the vehicle body, which can enhance a sense of unity between the rear seat 90 and the vehicle body.

(19) In the reinforcing member 20, a load input from the damper 92 into the damper supporting part 65 is likely to be transmitted through the rear seat supporting part 35 to the rear seat 90. Thus, the rear seat 90 is likely to move in conjunction with the motion of the vehicle body, so that a sense of unity between the rear seat and the vehicle body is even further enhanced.

(20) The rear seat supporting part 35 has the base portion 36 that is provided so as to protrude frontward from the reinforcing member coupling part 22, and the pivot portion 37 that is provided on the leading end side of the base portion 36, and the rear seat 90 is supported on the pivot portion 37 so as to be able to recline. Thus, even when the rear seat supporting part 35 is provided on the front side of the framework part of the rear vehicle body, the rear seat 90 can move in conjunction with the motion of the vehicle body.

(21) Since the rear seat supporting part 35 is coupled to the front side reinforcement 13 that is located close thereto and extends in the up-down direction through the base portion joint 22f and the front reinforcement joint 22g of the reinforcing member coupling part 22, the pivot portion 37 is likely to support the rear seat 90 with high rigidity in the up-down direction even when the rear seat supporting part 35 is provided on the front side of the reinforcing member coupling part 22 in the form of a cantilever.

(22) The first and second coupling part front-rear-direction ribs 45a, 45b are formed so as to be continuous with the upper and lower pair of upper wall and lower wall forming the rear seat supporting member mount portion 29. Specifically, the base portion ridges 36a of the base portion 36 of the rear seat supporting part 35, the base joint ridges 29a of the rear seat supporting member mount portion 29, and the first and second coupling part front-rear-direction ribs 45a, 45b are continuous with one another in the front-rear direction. Thus, the ridges or the ribs extend continuously in the front-rear direction from the inner side of the squared U-shaped cross section of the reinforcing member coupling part to the rear seat supporting part, so that the rigidity of the rear seat supporting part 35 provided on the front side of the reinforcing member coupling part 22 in the form of a cantilever is further enhanced.

In the above embodiment, the reinforcing member 20 is coupled to the front side reinforcement 13, the rear side reinforcement 14, and the rear cross member upper part 15 through the first to third coupling members 31 to 33, but the present invention is not limited to this example. Alternatively, the reinforcing member 20 may be directly coupled to the front side reinforcement 13, the rear side reinforcement 14, and the rear cross member upper part 15, for example, by SPR.

It is possible to make various modifications and changes to the present invention without departing from the gist and scope of the invention described in the claims.

As has been described above, the present invention makes it possible to make the rear vehicle body structure involved in supporting the rear suspension compact in the vehicle width direction, and yet to restrain deformation of the frame member under a load input from the damper. Thus, the present invention is suitably applicable in the field of this type of manufacturing technology.

What is claimed is:

1. A rear vehicle body structure comprising:
   a right and left pair of frame members extending in a front-rear direction in a rear part of a vehicle body, each having a respective damper supporting part which is located at an intermediate part in the front-rear direction of the respective frame member and to which a respective damper provided in a rear suspension is mounted from below;
   a pair of rear wheel wells, each provided adjacent to and on an outer side in a vehicle width direction of a respective one of the frame members;
   a rear floor extending inward in the vehicle width direction from inner ends in the vehicle width direction of the frame members;
   a cross member that is provided on an upper surface of the rear floor and connects the right and left pair of frame members to each other in the vehicle width direction on a front side of the damper supporting parts;
   a pair of front side reinforcements, each provided along a vehicle cabin inner side of a respective one of the rear wheel wells and extending in an up-down direction on the front side of the respective damper supporting part; and
   a pair of reinforcing members, each mounted on a respective one of the frame members and having a respective reinforcing member main body that reinforces the respective damper supporting part and a respective reinforcing member coupling part that couples together the cross member and a respective one of the front side reinforcements.

2. The rear vehicle body structure according to claim 1, wherein each reinforcing member coupling part has a cross section perpendicular to an extension direction thereof formed in a squared U-shape that opens toward a vehicle outer side.

3. The rear vehicle body structure according to claim 2, wherein:
   the cross member has a cross section perpendicular to an extension direction thereof formed in a top hat shape opening downward;

each front side reinforcement has a cross section perpendicular to an extension direction thereof formed in a top hat shape opening outward in the vehicle width direction; and the cross member, the front side reinforcements, and the reinforcing member coupling parts form a closed cross section on the vehicle cabin inner side of the rear floor, the frame members, and the rear wheel wells.

4. The rear vehicle body structure according to claim 3, wherein the cross member has a front and rear pair of cross member ridges for forming the top hat-shaped cross section that is formed in an upper part of the cross member and extends in the vehicle width direction;

the front side reinforcements each have a front and rear pair of front reinforcing part ridges for forming the top hat-shaped cross section that is formed at an inner end in the vehicle width direction of the front side reinforcement and extends in the up-down direction;

the reinforcing member coupling parts each have a front and rear pair of coupling part ridges for forming the squared U-shaped cross section that is formed at an end of the reinforcing member coupling part on the vehicle cabin inner side; and the front and rear pair of cross member ridges, the front and rear pair of front reinforcing part ridges, and the front and rear pair of coupling part ridges are continuous with one another.

5. The rear vehicle body structure according to claim 1, wherein the reinforcing member coupling parts each have a coupling part inclined portion that, as seen in a front view of the vehicle body, extends in a straight line in a direction oriented outward in the vehicle width direction and inclined upward so as to couple together the cross member and the respective front side reinforcement as a bracing strut.

6. The rear vehicle body structure according to claim 1, wherein the reinforcing members each have a front-rear-direction rib that couples together the respective reinforcing member main body and the respective reinforcing member coupling part in the front-rear direction.

7. The rear vehicle body structure according to claim 6, wherein each reinforcing member main body comprises:
a reinforcing member upper wall that supports the respective damper supporting part from above;
a reinforcing member inner wall that extends downward from an inner end in the vehicle width direction of the reinforcing member upper wall and supports the inner end in the vehicle width direction of the respective frame member on the inner side in the vehicle width direction; and
an outer flange that extends upward from an outer end in the vehicle width direction of the reinforcing member upper wall and abuts against the respective rear wheel well on the inner side in the vehicle width direction, and each reinforcing member has a plurality of front-rear-direction ribs, and the respective reinforcing member upper wall, the respective reinforcing member inner wall, and the respective outer flange are coupled to the respective reinforcing member coupling part by the respective front-rear-direction ribs.

8. A rear vehicle body structure comprising:

a right and left pair of frame members extending in a front-rear direction in a rear part of a vehicle body, each having a respective damper supporting part which is located at an intermediate part in the front-rear direction of the respective frame member and to which a respective damper provided in a rear suspension is mounted from below;

a pair of rear wheel wells, each provided adjacent to and on an outer side in a vehicle width direction of a respective one of the frame members;

a rear floor extending inward in the vehicle width direction from inner ends in the vehicle width direction of the frame members;

a cross member that is provided on an upper surface of the rear floor and connects the right and left pair of frame members to each other in the vehicle width direction on a front side of the damper supporting part;

a pair of front side reinforcements, each provided along a vehicle cabin inner side of a respective one of the rear wheel wells and extending in an up-down direction on the front side of the respective damper supporting part; and a pair of reinforcing members, each mounted on a respective one of the frame members and having a respective reinforcing member main body that reinforces the respective damper supporting part and a respective reinforcing member coupling part that couples together the cross member and a respective one of the front side reinforcements, wherein the reinforcing member coupling parts each have a coupling part inclined portion that, as seen in a front view of the vehicle body, extends in a straight line in a direction oriented outward in the vehicle width direction and inclined upward so as to couple together the cross member and the respective front side reinforcement as a bracing strut, and the reinforcing members each have a front-rear-direction rib that couples together the respective reinforcing member main body and the respective reinforcing member coupling part in the front-rear direction.

* * * * *